United States Patent
Ma et al.

(10) Patent No.: US 12,046,752 B2
(45) Date of Patent: Jul. 23, 2024

(54) COMPOSITE POSITIVE ELECTRODE ACTIVE MATERIAL, METHOD OF PREPARING THE SAME, POSITIVE ELECTRODE INCLUDING THE SAME, AND SECONDARY BATTERY INCLUDING THE SAME

(71) Applicant: Samsung Electronics Co., Ltd., Suwon-si (KR)

(72) Inventors: Sangbok Ma, Suwon-si (KR); Joonhee Kim, Seoul (KR); Jonghoon Ka, Suwon-si (KR); Sungjin Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 237 days.

(21) Appl. No.: 17/546,221

(22) Filed: Dec. 9, 2021

(65) Prior Publication Data
US 2022/0407071 A1    Dec. 22, 2022

(30) Foreign Application Priority Data
Jun. 21, 2021    (KR) .................. 10-2021-0080367

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0471* (2013.01); *H01M 4/366* (2013.01);
(Continued)

(58) Field of Classification Search
CPC .. H01M 4/5825; H01M 4/0471; H01M 4/366; H01M 10/0562; H01M 2004/028; H01M 2300/0071
(Continued)

(56) References Cited

U.S. PATENT DOCUMENTS 7,914,932 B2    3/2011  Yoshida et al.
7,998,622 B2    8/2011  Inda
(Continued)

FOREIGN PATENT DOCUMENTS

JP    2013084521 A    5/2013
KR    1020220053459 A    4/2022
(Continued)

OTHER PUBLICATIONS

Materials Data on LiCoPO4, Apr. 29, 2020, The Materials Project (Year: 2020).*
(Continued)

*Primary Examiner* — Pamela H Weiss
*Assistant Examiner* — John S Medley
(74) *Attorney, Agent, or Firm* — CANTOR COLBURN LLP

(57) ABSTRACT

A positive electrode active material includes a lithium-transition metal composite phosphate including a first crystalline phase having a composition represented by Formula 1 and having an olivine structure, and a second crystalline phase having a composition represented by Formula 2 and having a pyrophosphate-containing structure, wherein the second crystalline phase is in an amount of greater than 0 mole percent and not greater than 50 mole percent with respect to a total number of moles of the first crystalline phase and the second crystalline phase, a positive electrode, a secondary battery:

$Li_xM1_yPO_4$    Formula 1

$Li_aM2_b(P_2O_7)_4$    Formula 2

(Continued)

In Formulas 1 and 2, $0.9 \leq x \leq 1.1$, $0.9 \leq y \leq 1.1$, $5.5 \leq a \leq 6.5$, and $4.8 \leq b \leq 5.2$, and M1 and M2 are each independently an element from Groups 3 to 11 in the 4th period of the Periodic Table of the Elements, or a combination thereof.

27 Claims, 9 Drawing Sheets

(51) Int. Cl.
  *H01M 4/36*  (2006.01)
  *H01M 10/0562*  (2010.01)
  *H01M 4/02*  (2006.01)

(52) U.S. Cl.
  CPC .. *H01M 10/0562* (2013.01); *H01M 2004/028* (2013.01); *H01M 2300/0071* (2013.01)

(58) Field of Classification Search
  USPC ................................................ 429/209
  See application file for complete search history.

(56) References Cited

U.S. PATENT DOCUMENTS

| | | | |
|---|---|---|---|
| 8,541,136 B2 * | 9/2013 | Beck | H01M 4/5825 |
| | | | 429/231.95 |
| 8,778,542 B2 | 7/2014 | Iwaya et al. | |
| 9,034,524 B2 | 5/2015 | Moon et al. | |
| 9,159,989 B2 | 10/2015 | Ogasa | |
| 9,214,669 B2 | 12/2015 | Matsuno et al. | |
| 9,368,828 B2 | 6/2016 | Ouchi et al. | |
| 9,419,308 B2 | 8/2016 | Sano | |
| 9,577,285 B2 | 2/2017 | Chu et al. | |
| 9,859,559 B2 | 1/2018 | Kim et al. | |
| 9,865,899 B2 | 1/2018 | Ito et al. | |
| 10,096,818 B2 | 10/2018 | Teraoka et al. | |
| 10,135,084 B2 | 11/2018 | Lee et al. | |
| 10,601,073 B2 | 3/2020 | Yoshioka et al. | |
| 2009/0220860 A1 * | 9/2009 | Xi | H01M 4/525 |
| | | | 429/231.95 |
| 2011/0003212 A1 | 1/2011 | Sato et al. | |
| 2016/0204464 A1 | 7/2016 | Cho et al. | |
| 2019/0140265 A1 | 5/2019 | Miara et al. | |
| 2019/0157670 A1 | 5/2019 | Wolter et al. | |
| 2019/0229334 A1 | 7/2019 | Kurita | |
| 2020/0381775 A1 | 12/2020 | Fujii et al. | |
| 2021/0184248 A1 | 6/2021 | Ono | |
| 2021/0280869 A1 | 9/2021 | Nakano | |
| 2021/0408531 A1 * | 12/2021 | Ito | H01M 4/5825 |

FOREIGN PATENT DOCUMENTS

| | | |
|---|---|---|
| KR | 1020220064275 A | 5/2022 |
| KR | 1020220069620 A | 5/2022 |
| WO | 2018092434 A1 | 5/2018 |
| WO | 2019082477 A1 | 5/2019 |
| WO | 2019163448 A1 | 8/2019 |
| WO | 2020110666 A1 | 6/2020 |

OTHER PUBLICATIONS

Materials Data on Li6Co5(P2O7)4, May 2, 2020, The Materials Project (Year: 2020).*

Gellert et al., Compatibility Study of Oxide and Olivine Cathode Materials with Lithium Aluminum Titanium Phosphate, Sep. 20, 2017, Ionics, 24, pp. 1001, 1002, and 1004 (Year: 2018).*

Lin et al., Phase Relation of Li2O—CoO—P2O5 Ternary System and Electrochemical Behaviors of Co-Base Polyphosphates within This System, 2015, Journal of Alloys and Compounds, 646, pp. 728 and 732 (Year: 2015).*

* cited by examiner

COMPOSITE POSITIVE ELECTRODE ACTIVE MATERIAL, METHOD OF PREPARING THE SAME, POSITIVE ELECTRODE INCLUDING THE SAME, AND SECONDARY BATTERY INCLUDING THE SAME

CROSS-REFERENCE TO RELATED APPLICATION

This application claims priority to Korean Patent Application No. 10-2021-0080367, filed on Jun. 21, 2021, in the Korean Intellectual Property Office, and the benefits accruing therefrom under 35 U.S.C. § 119, the disclosure of which is incorporated by reference herein in its entirety.

BACKGROUND

1. Field

The present disclosure relates to a composite positive electrode active material, a method of preparing the same, a positive electrode including the same, and a secondary battery including the same.

2. Description of the Related Art

For lithium secondary batteries including liquid electrolytes containing combustible organic solvents, there is a possibility of either overheating or fire when a short circuit occurs. For that reason, there has been a proposal for all-solid batteries using solid electrolytes instead of liquid electrolytes.

All-solid batteries do not include combustible organic solvents, and thus may have significantly reduced risk of causing a fire, even if short circuits occur. Therefore, all-solid batteries are regarded as providing far greater safety than lithium-ion batteries using combustible organic electrolytes.

In addition, all-solid batteries are chargeable beyond the voltage limit of liquid electrolytes, and thus may use high-voltage positive electrode materials to further increase battery energy density.

All-solid batteries including metal oxides as a negative electrode material require high-voltage positive electrode materials to avoid a reduced cell voltage, as compared to batteries including carbon-based negative electrode materials. Accordingly there is a continuing need in the art for high-voltage positive electrode materials.

SUMMARY

An aspect provides a novel positive electrode active material providing high voltage and improved discharge capacity.

Another aspect provides a positive electrode including the positive electrode active material described above, and a secondary battery.

Yet another aspect provides a method of preparing the positive electrode active material described above.

Additional aspects will be set forth in part in the description which follows and, in part, will be apparent from the description, or may be learned by practice of the presented embodiments of the disclosure.

According to an aspect, provided is a composite positive electrode active material including a lithium-transition metal composite phosphate including: a first crystalline phase having a composition represented by Formula 1 and having an olivine structure; and a second crystalline phase having a composition represented by Formula 2 and having a pyrophosphate-containing structure, wherein the second crystalline phase is contained in an amount of greater than 0 mole percent and not greater than 50 mole percent, with respect to a total number of moles of the first crystalline phase and the second crystalline phase, $$Li_xM1_yPO_4 \quad \text{Formula 1}$$

$$Li_aM2_b(P_2O_7)_4 \quad \text{Formula 2}$$

wherein in Formulas 1 and 2, $0.9 \leq x \leq 1.1$, $0.9 \leq y \leq 1.1$, $5.5 \leq a \leq 6.5$, and $4.8 \leq b \leq 5.2$, and M1 and M2 are each independently an element from Groups 3 to 11 in the 4th period of the Periodic Table of the Elements, or a combination thereof.

According to another aspect, provided is a positive electrode including the positive electrode active material.

According to yet another aspect, provided is a secondary battery including: a positive electrode; a negative electrode; and an electrolyte positioned between the positive electrode and the negative electrode, wherein the positive electrode includes the positive electrode active material.

According to yet another aspect, provided is a method of preparing a composite positive electrode active material including: mixing an M1 precursor, an M2 precursor, a lithium precursor, and a phosphorus precursor to prepare a precursor mixture; and heat-treating the precursor mixture to form the composite positive electrode active material comprising a lithium-transition metal composite phosphate, wherein, in the precursor mixture, a molar ratio of the sum of M1 and M2 to phosphorus is about 1:0.8 to about 1:1.3, the lithium-transition metal composite phosphate includes a first crystalline phase having a composition represented by Formula 1 and having an olivine structure, and a second crystalline phase having a composition represented by Formula 2 and having a pyrophosphate-containing structure, and the second crystalline phase is in an amount of greater than 0 mole percent and not greater than 50 mole percent with respect to a total number of moles of the first crystalline phase and the second crystalline phase:

$$Li_xM1_yPO_4 \quad \text{Formula 1}$$

$$Li_aM2_b(P_2O_7)_4 \quad \text{Formula 2}$$

wherein in Formulas 1 and 2, $0.9 \leq x \leq 1.1$, $0.9 \leq y \leq 1.1$, $5.5 \leq a \leq 6.5$, and $4.8 \leq b \leq 5.2$, and M1 and M2 are each independently an element from Groups 3 to 11 in the 4th period of the Periodic Table of the Elements, or a combination thereof.

Also disclosed is a method of manufacturing a battery, the method including: providing a positive electrode, an electrolyte, and a negative electrode; and disposing the electrolyte between the positive electrode and the negative electrode, wherein the positive electrode includes the composite positive electrode active material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
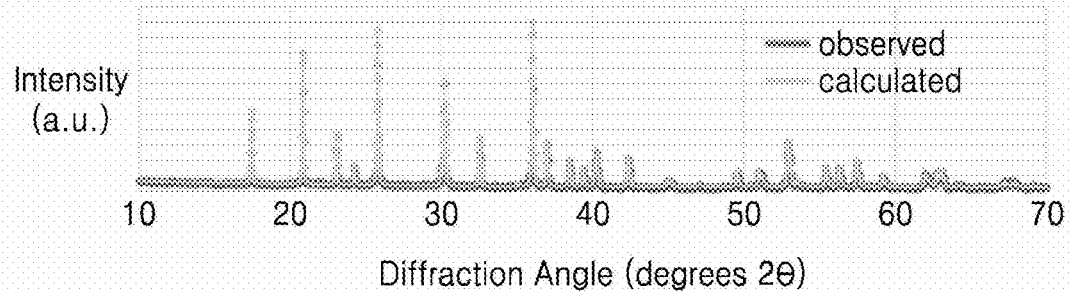
FIG. 1A is a graph of intensity (arbitrary units, a.u.) versus diffraction angle (degrees 2θ) showing X-ray diffraction analysis results of a positive electrode active material prepared in Comparative Preparation Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

The present inventive concept described below may be modified in various forms and have many embodiments, and particular embodiments are illustrated in the drawings and described in detail in the detailed description. However, the present inventive concept should not be construed as limited to the particular embodiments, but should be understood to cover all modifications, equivalents or replacements included in the technical scope of the present inventive concept.

The terminology used herein is for the purpose of explaining particular embodiments only and is not intended to be limiting. The singular forms include the plural forms as well, unless the context clearly indicates otherwise. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprise" or "comprising" or "includes" and/or "including" when used herein, specify the presence of stated features, numbers, steps, operations, elements, parts, components, materials, or combinations thereof, but do not preclude the presence or addition of one or more other features, numbers, steps, operations, elements, parts, components, materials, or combinations thereof. "/" used hereinafter may be interpreted as "and" or interpreted as "or" according to circumstances.

In the drawings, the thicknesses of layers and regions are enlarged or reduced for clear explanation. The same reference numerals are designated for similar elements throughout. When a layer, film, region, plate, or the like is referred to as being "on" another part, it can be directly on the other part, or intervening parts may be present. In contrast, when an element is referred to as being "directly on" another element, there are no intervening elements present. The terms "first", "second", and the like may be used for describing various elements, components, regions, layers, and/or sections, throughout, but the elements, components, regions, layers, and/or sections, are not limited by the terms. The terms are used to only distinguish one element, component, region, layer or section from other elements, elements, components, regions, layers or sections. Thus, "a first element," "component," "region," "layer," or "section" discussed below could be termed a second element, component, region, layer, or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a pyrophosphate-containing structure means a structure that contains phosphorous oxyanions, which have two phosphorus atoms in a P—O—P linkage.

Hereinafter, a composite positive electrode active material according to an embodiment, a method of preparing the same, an electrode, a secondary battery, and an article including the same will be described in further detail.

Provided is a composite positive electrode active material including a lithium-transition metal composite phosphate including: a first crystalline phase having a composition represented by Formula 1 and having an olivine structure; and a second crystalline phase having a composition represented by Formula 2 and having a pyrophosphate-containing structure, the second crystalline phase being contained in an amount of greater than 0 mole percent and not greater than 50 mole percent with respect to a total number of moles of the first crystalline phase and the second crystalline phase:

$$Li_xM1_yPO_4 \quad \text{Formula 1}$$

$$Li_aM2_b(P_2O_7)_4 \quad \text{Formula 2}$$

wherein in Formulas 1 and 2, $0.9 \leq x \leq 1.1$, $0.9 \leq y \leq 1.1$, $5.5 \leq a \leq 6.5$, and $4.8 \leq b \leq 5.2$, and M1 and M2 are each independently an element from Groups 3 to 11 in the 4th period of the Periodic Table of the Elements, or a combination thereof.

In the lithium-transition metal composite phosphate, the amount of the second crystalline phase is, for example, about 1 mole percent (mol %) to about 50 mol %, about 5 mol % to about 45 mol %, about 5 mol % to about 40 mol %, about 10 mol % to about 40 mol %, or about 15 mol % to about 35 mol % with respect to a total number of moles of the first crystalline phase and the second crystalline phase.

A phosphoric acid-based compound, e.g., a phosphate or pyrophosphate, such as a phosphate having an olivine structure, for example, $LiCoPO_4$, theoretically has high voltage, and a high discharge capacity of 100 mAh/g or more. However, $LiCoPO_4$ has poor structural stability, and thus the measured discharge capacity of $LiCoPO_4$, which is obtained from a lithium battery, is less than 50 mAh/g, and the cycle characteristics thereof are poor. In addition, a phosphoric acid-based compound having a pyrophosphate-containing structure, for example, $Li_6Co_5(P_2O_7)_4$, has improved structural stability compared to a compound having an olivine structure, but the phosphoric acid-based compound having a pyrophosphate-containing structure still has a poor discharge capacity.

It has been surprisingly discovered that the lithium-transition metal composite phosphate, including a first crystalline phase having an olivine structure and a second crystalline phase having a pyrophosphate-containing structure, can provide improved discharge capacity and high voltage.

The introduction of the second crystalline phase having a pyrophosphate-containing structure to a compound including a first crystalline phase having an olivine structure may allow the second crystalline phase to improve the structural stability of the first crystalline phase. Accordingly, the lithium-transition metal composite phosphate including both the first crystalline phase and the second crystalline phase may provide a discharge capacity closer to the theoretical capacity of the first crystalline phase. In addition, the lithium-transition metal composite phosphate including the first crystalline phase and the second crystalline phase has excellent structural stability, and thus a lithium battery including such a lithium-transition metal composite phosphate may have improved lifespan characteristics. In addition, the lithium-transition metal composite phosphate stays at high voltage, and thus a lithium battery including such a lithium-transition metal composite phosphate may have an improved energy density.

M1 included in Formula 1 in the first crystalline phase and M2 included in Formula 2 in the second crystalline phase may be each independently, for example, Co, Ni, Mn, Fe, Cu, Zn, Ti, V, Cr, or a combination thereof.

The first crystalline phase included in the lithium-transition metal composite phosphate may have, for example, a composition represented by Formula 3:

$$Li_x(Co_{1-w}M3_w)_yPO_4. \quad \text{Formula 3}$$

wherein in Formula 3, $0.9 \leq x \leq 1.1$, $0.9 \leq y \leq 1.1$, and $0 \leq w \leq 1$, and M3 is an element from Groups 3 to 8, 10, and 11 in the 4th period of the Periodic Table of the Elements, or a combination thereof.

M3 included in Formula 3 may be, for example, Ni, Mn, Fe, Cu, Zn, Ti, V, Cr, or a combination thereof.

The first crystalline phase included in the lithium-transition metal composite phosphate may have, for example, a composition selected from compositions represented by Formulas 4a to 4i:

$$Li_xCo_yPO_4 \quad \text{Formula 4a}$$

wherein in Formula 4a, $0.9 < x < 1.1$, and $0.9 < y < 1.1$;

$$Li_x(Co_{1-w}Ni_w)_yPO_4 \quad \text{Formula 4b}$$

wherein in Formula 4b, $0.9 < x < 1.1$, $0.9 < y < 1.1$, and $0 < w < 1$;

$$Li_x(Co_{1-w}Mn_w)_yPO_4 \quad \text{Formula 4c}$$

wherein in Formula 4c, $0.9 < x < 1.1$, $0.9 < y < 1.1$, and $0 < w < 1$;

$$Li_x(Co_{1-w}Fe_w)_yPO_4 \quad \text{Formula 4d}$$

wherein in Formula 4d, $0.9 < x < 1.1$, $0.9 < y < 1.1$, and $0 < w < 1$;

$$Li_x(Co_{1-w}Cu_w)_yPO_4 \quad \text{Formula 4e}$$

wherein in Formula 4e, $0.9 < x < 1.1$, $0.9 < y < 1.1$, and $0 < w < 1$;

$$Li_x(Co_{1-w}Zn_w)_yPO_4 \quad \text{Formula 4f}$$

wherein in Formula 4f, $0.9 < x < 1.1$, $0.9 < y < 1.1$, and $0 < w < 1$;

$$Li_x(Co_{1-w}Ti_w)_yPO_4 \quad \text{Formula 4g}$$

wherein in Formula 4g, $0.9 \leq x \leq 1.1$, $0.9 \leq y \leq 1.1$, and $0 < w < 1$;

$$Li_x(Co_{1-w}V_w)_yPO_4 \quad \text{Formula 4h}$$

wherein in Formula 4h, $0.9<x<1.1$, $0.9<y<1.1$, and $0<w<1$; or $$Li_x(Co_{1-w}Cr_w)_yPO_4 \quad \text{Formula 4i}$$

wherein in Formula 4i, $0.9<x<1.1$, $0.9<y<1.1$, and $0<w<1$.

The first crystalline phase included in the lithium-transition metal composite phosphate may have, for example, a composition selected from among compositions represented by Formulas:

$LiCoPO_4, Li(Co_{0.99}Ni_{0.01})PO_4, Li(Co_{0.98}Ni_{0.02})PO_4, Li(Co_{0.95}Ni_{0.05})PO_4, Li(Co_{0.9}Ni_{0.1})PO_4, Li(Co_{0.8}Ni_{0.2})PO_4, Li(Co_{0.7}Ni_{0.3})PO_4, Li(Co_{0.6}Ni_{0.4})PO_4$;

$Li(Co_{0.99}Mn_{0.01})PO_4, Li(Co_{0.98}Mn_{0.02})PO_4, Li(Co_{0.95}Mn_{0.05})PO_4, Li(Co_{0.9}Mn_{0.1})PO_4, Li(Co_{0.8}Mn_{0.2})PO_4, Li(Co_{0.7}Mn_{0.3})PO_4, Li(Co_{0.6}Mn_{0.4})PO_4$;

$Li(Co_{0.99}Fe_{0.01})PO_4, Li(Co_{0.98}Fe_{0.02})PO_4, Li(Co_{0.95}Fe_{0.05})PO_4, Li(Co_{0.9}Fe_{0.1})PO_4, Li(Co_{0.8}Fe_{0.2})PO_4, Li(Co_{0.7}Fe_{0.3})PO_4, Li(Co_{0.6}Fe_{0.4})PO_4$;

$Li(Co_{0.99}Cu_{0.01})PO_4, Li(Co_{0.98}Cu_{0.02})PO_4, Li(Co_{0.95}Cu_{0.05})PO_4, Li(Co_{0.9}Cu_{0.1})PO_4, Li(Co_{0.8}Cu_{0.2})PO_4, Li(Co_{0.7}Cu_{0.3})PO_4, Li(Co_{0.6}Cu_{0.4})PO_4$;

$Li(Co_{0.99}Zn_{0.01})PO_4, Li(Co_{0.98}Zn_{0.02})PO_4, Li(Co_{0.95}Zn_{0.05})PO_4, Li(Co_{0.9}Zn_{0.1})PO_4, Li(Co_{0.8}Zn_{0.2})PO_4, Li(Co_{0.7}Zn_{0.3})PO_4, Li(Co_{0.6}Zn_{0.4})PO_4$;

$Li(Co_{0.99}Ti_{0.01})PO_4, Li(Co_{0.98}Ti_{0.02})PO_4, Li(Co_{0.95}Ti_{0.05})PO_4, Li(Co_{0.9}Ti_{0.1})PO_4, Li(Co_{0.8}Ti_{0.2})PO_4, Li(Co_{0.7}Ti_{0.3})PO_4, Li(Co_{0.6}Ti_{0.4})PO_4$;

$Li(Co_{0.99}V_{0.01})PO_4, Li(Co_{0.98}V_{0.02})PO_4, Li(Co_{0.95}V_{0.05})PO_4, Li(Co_{0.9}V_{0.1})PO_4, Li(Co_{0.8}V_{0.2})PO_4, Li(Co_{0.7}V_{0.3})PO_4, Li(Co_{0.6}V_{0.4})PO_4$;

$Li(Co_{0.99}Cr_{0.01})PO_4, Li(Co_{0.98}Cr_{0.02})PO_4, Li(Co_{0.95}Cr_{0.05})PO_4, Li(Co_{0.9}Cr_{0.1})PO_4, Li(Co_{0.8}Cr_{0.2})PO_4, Li(Co_{0.7}Cr_{0.3})PO_4, Li(Co_{0.6}Cr_{0.4})PO_4$, or a combination thereof.

The second crystalline phase included in the lithium-transition metal composite phosphate may have, for example, a composition represented by Formula 5:

$$Li_cM4_d(P_2O_7)_4. \quad \text{Formula 5}$$

wherein in Formula 5, $5.6 \le c \le 6.4$, and $4.8 \le d \le 5.2$, and M4 is Co, Ni, Mn, Fe, or a combination thereof.

The second crystalline phase included in the lithium-transition metal composite phosphate may have, for example, a composition represented by Formula 6:

$$Li_eCo_f(P_2O_7)_4. \quad \text{Formula 6}$$

wherein in Formula 6, $5.7 \le e \le 6.3$, and $4.9 \le f \le 5.1$.

The lithium-transition metal composite phosphate may include a composite phase having the first crystalline phase and the second crystalline phase. The first crystalline phase and the second crystalline phase are formed into a composite phase to provide the lithium-transition metal composite phosphate with improved structural stability, and thus a lithium battery including such a lithium-transition metal composite phosphate may have improved discharge capacity, lifespan characteristics, and energy density, etc.

The lithium-transition metal composite phosphate may have, for example, a composition represented by Formula 7:

$$pLi_aM2_b(P_2O_7)_4 \cdot (1-p)Li_xM1_yPO_4. \quad \text{Formula 7}$$

wherein in Formula 7, $0<p \le 0.5$, $0.9 \le x \le 1.1$, $0.9 \le y \le 1.1$, $5.5 \le a \le 6.5$, and $4.8 \le b \le 5.2$, and M1 and M2 are each independently an element from Groups 3 to 11 in the 4th period of the Periodic Table of the Elements, or a combination thereof.

The composite phase included in the lithium-transition metal composite phosphate may have, for example, a composition represented by Formula 7. In Formula 7, p is the amount of the first crystalline phase among the first and second crystalline phases included in the composite phase.

The lithium-transition metal composite phosphate having the composition of Formula 7 may alternatively have a composition represented by Formula 8.

The lithium-transition metal composite phosphate, for example, as a composition determined in an ICP (inductively coupled plasma) analysis, may have a composition represented by Formula 8:

$$Li_cM5_dPO_4. \quad \text{Formula 8}$$

wherein in Formula 8, $0.8 \le c \le 1.2$ and $0.8 \le d \le 1.22$, and M5 is an element from Groups 3 to 11 in the 4th period of the Periodic Table of the Elements, or a combination thereof.

When analyzed by inductively coupled plasma atomic emission spectroscopy (ICP-AES), a molar ratio of P to Li, a molar ratio of P to M5, and a molar ratio of P to O may be determined, and the composition represented by Formula 8 may be derived therefrom.

The lithium-transition metal composite phosphate may have, for example, a composition represented by Formula 9:

$$Li_cCo_eM6_fPO_4. \quad \text{Formula 9}$$

wherein in Formula 9, $0.8 \le c \le 1.2$, $0.8 \le e \le 1.2$, and $0 \le f \le 0.2$, and M6 is Ni, Mn, Fe, Cu, Zn, Ti, V, Cr, or a combination thereof.

The lithium-transition metal composite phosphate may have, for example, a composition represented by Formula 10 or 11:

$$Li_cCo_ePO_4 \quad \text{Formula 10}$$

wherein in Formula 10, $0.8 \le c \le 1.2$, and $0.8 \le e \le 1.2$, and $$Li_cCo_eM6_fPO_4 \quad \text{Formula 11}$$

wherein in Formula 11, $0.8 \le c \le 1.2$, $0.8 \le e \le 1.2$, and $0<f \le 0.2$, and M6 is Ni, Mn, Fe, Cu, Zn, Ti, V, Cr, or a combination thereof.

The lithium-transition metal composite phosphate may have, for example, a composition represented by any of the Formulas:

$Li_cCo_ePO_4 (0.9 \le c \le 1.1, 0.9 \le e \le 1.1)$;

$Li_cCo_eNi_{0.01}PO_4 (0.9 \le c \le 1.1, 0.9 \le e \le 1.1)$,
$Li_cCo_eNi_{0.02}PO_4 (0.9 \le c \le 1.1, 0.9 \le e \le 1.1)$,
$Li_cCo_eNi_{0.05}PO_4 (0.9 \le c \le 1.1, 0.9 \le e \le 1.1)$,
$Li_cCo_eNi_{0.09}PO_4 (0.9 \le c \le 1.1, 0.9 \le e \le 1.1)$,
$Li_cCo_eNi_{0.09}PO_4 (0.9 \le c \le 1.1, 0.9 \le e \le 1.1)$,
$Li_cCo_eNi_{0.1}PO_4 (0.9 \le c \le 1.1, 0.9 \le e \le 1.1)$;

$Li_cCo_eNi_{0.11}PO_4 (0.9 \le c \le 1.1, 0.9 \le e \le 1.1)$,
$Li_cCo_eNi_{0.12}PO_4 (0.9 \le c \le 1.1, 0.9 \le e \le 1.1)$,
$Li_cCo_eNi_{0.13}PO_4 (0.9 \le c \le 1.1, 0.9 \le e \le 1.1)$,
$Li_cCo_eNi_{0.14}PO_4 (0.9 \le c \le 1.1, 0.9 \le e \le 1.1)$,
$Li_cCo_eNi_{0.15}PO_4 (0.9 \le c \le 1.1, 0.9 \le e \le 1.1)$,
$Li_cCo_eNi_{0.2}PO_4 (0.9 \le c \le 1.1, 0.9 \le e \le 1.1)$;

$Li_cCo_eMn_{0.01}PO_4 (0.9 \le c \le 1.1, 0.9 \le e \le 1.1)$,
$Li_cCo_eMn_{0.02}PO_4 (0.9 \le c \le 1.1, 0.9 \le e \le 1.1)$,
$Li_cCo_eMn_{0.05}PO_4 (0.9 \le c \le 1.1, 0.9 < e \le 1.1)$,
$Li_cCo_eMn_{0.08}PO_4 (0.9 \le c \le 1.1, 0.9 \le e \le 1.1)$, $Li_cCo_eMn_{0.09}PO_4$ (0.9≤c≤1.1, 0.9≤e≤1.1),
$Li_cCo_eMn_{0.1}PO_4$ (0.9≤c≤1.1, 0.9≤e≤1.1);

$Li_cCo_eMn_{0.11}PO_4$ (0.9≤c≤1.1, 0.9≤e≤1.1),
$Li_cCo_eMn_{0.12}PO_4$ (0.9≤c≤1.1, 0.9 ≤e≤1.1),
$Li_cCo_eMn_{0.13}PO_4$ (0.9≤c≤1.1, 0.9<≤e≤1.1),
$Li_cCo_eMn_{0.14}PO_4$ (0.9≤c≤1.1, 0.9 ≤e≤1.1),
$Li_cCo_eMn_{0.15}PO_4$ (0.9≤c≤1.1, 0.9≤e≤1.1),
$Li_cCo_eMn_{0.2}PO_4$ (0.9≤c≤1.1, 0.9≤e≤1.1);

$Li_cCo_eFe_{0.01}PO_4$ (0.9≤c≤1.1, 0.9≤e≤1.1),
$Li_cCo_eFe_{0.02}PO_4$ (0.9≤c≤1.1, 0.9 ≤e≤1.1),
$Li_cCo_eFe_{0.05}PO_4$ (0.9≤c≤1.1, 0.9<≤e≤1.1),
$Li_cCo_eFe_{0.08}PO_4$ (0.9≤c≤1.1, 0.9 ≤e≤1.1),
$Li_cCo_eFe_{0.09}PO_4$ (0.9≤c≤1.1, 0.9≤e≤1.1),
$Li_cCo_eFe_{0.1}PO_4$ (0.9≤c≤1.1, 0.9 ≤e≤1.1);

$Li_cCo_eFe_{0.11}PO_4$ (0.9≤c≤1.1, 0.9≤e≤1.1),
$Li_cCo_eFe_{0.12}PO_4$ (0.9≤c≤1.1, 0.9 ≤e≤1.1),
$Li_cCo_eFe_{0.13}PO_4$ (0.9≤c≤1.1, 0.9≤e≤1.1),
$Li_cCo_eFe_{0.14}PO_4$ (0.9≤c≤1.1, 0.9 ≤e≤1.1),
$Li_cCo_eFe_{0.15}PO_4$ (0.9≤c≤1.1, 0.9≤e≤1.1),
$Li_cCo_eFe_{0.2}PO_4$ (0.9≤c≤1.1, 0.9 ≤e≤1.1);

$Li_cCo_eCu_{0.01}PO_4$ (0.9≤c≤1.1, 0.9≤e≤1.1),
$Li_cCO_eCu_{0.02}PO_4$ (0.9≤c≤1.1, 0.9 ≤e≤1.1),
$Li_cCO_eCu_{0.05}PO_4$ (0.9≤c≤1.1, 0.9<≤e≤1.1),
$Li_cCO_eCu_{0.08}PO_4$ (0.9≤c≤1.1, 0.9 ≤e≤1.1),
$Li_cCo_eCu_{0.09}PO_4$ (0.9≤c≤1.1, 0.9≤e≤1.1),
$Li_cCO_eCu_{0.1}PO_4$ (0.9≤c≤1.1, 0.9≤e≤1.1);

$Li_cCo_eCu_{0.11}PO_4$ (0.9≤c≤1.1, 0.9≤e≤1.1),
$Li_cCO_eCu_{0.12}PO_4$ (0.9≤c≤1.1, 0.9 ≤e≤1.1),
$Li_cCo_eCu_{0.13}PO_4$ (0.9≤c≤1.1, 0.9≤≤e≤1.1),
$Li_cCo_eCu_{0.14}PO_4$ (0.9≤c≤1.1, 0.9 ≤e≤1.1),
$Li_cCo_eCu_{0.15}PO_4$ (0.9≤c≤1.1, 0.9≤e≤1.1),
$Li_cCo_eCu_{0.2}PO_4$ (0.9≤c≤1.1, 0.9≤e≤1.1);

$Li_cCo_eZn_{0.01}PO_4$ (0.9≤c≤1.1, 0.9≤e≤1.1),
$Li_cCO_eZn_{0.02}PO_4$ (0.9≤c≤1.1, 0.9 ≤e≤1.1),
$Li_cCo_eZn_{0.05}PO_4$ (0.9≤c≤1.1, 0.9≤≤e≤1.1),
$Li_cCo_eZn_{0.08}PO_4$ (0.9≤c≤1.1, 0.9 ≤e≤1.1),
$Li_cCo_eZn_{0.09}PO_4$ (0.9≤c≤1.1, 0.9≤e≤1.1),
$Li_cCo_eZn_{0.1}PO_4$ (0.9≤c≤1.1, 0.9 ≤e≤1.1);

$Li_cCo_eZn_{0.11}PO_4$ (0.9≤c≤1.1, 0.9≤e≤1.1),
$Li_cCo_eZn_{0.12}PO_4$ (0.9≤c≤1.1, 0.9 ≤e≤1.1),
$Li_cCo_eZn_{0.13}PO_4$ (0.9≤c≤1.1, 0.9≤≤e≤1.1),
$Li_cCo_eZn_{0.14}PO_4$ (0.9≤c≤1.1, 0.9≤e≤1.1),
$Li_cCo_eZn_{0.15}PO_4$ (0.9≤c≤1.1, 0.9≤e≤1.1),
$Li_cCo_eZn_{0.2}PO_4$ (0.9≤c≤1.1, 0.9≤e≤1.1);

$Li_cCO_eTi_{0.01}PO_4$ (0.9≤c≤1.1, 0.9≤e≤1.1),
$Li_cCO_eTi_{0.02}PO_4$ (0.9≤c≤1.1, 0.9≤e≤1.1),
$Li_cCO_eTi_{0.05}PO_4$ (0.9≤c≤1.1, 0.9≤e≤1.1),
$Li_cCO_eTi_{0.08}PO_4$ (0.9≤c≤1.1, 0.9 ≤e≤1.1),
$Li_cCO_eTi_{0.09}PO_4$ (0.9≤c≤1.1, 0.9≤e≤1.1),
$Li_cCo_eTi_{0.1}PO_4$ (0.9≤c≤1.1, 0.9 ≤e≤1.1);

$Li_cCo_eTi_{0.11}PO_4$ (0.9≤c≤1.1, 0.9≤e≤1.1),
$Li_cCO_eTi_{0.12}PO_4$ (0.9≤c≤1.1, 0.9≤e≤1.1),
$Li_cCO_eTi_{0.13}PO_4$ (0.9≤c≤1.1, 0.9≤e≤1.1),
$Li_cCO_eTi_{0.14}PO_4$ (0.9≤c≤1.1, 0.9≤e≤1.1),
$Li_cCO_eTi_{0.15}PO_4$ (0.9≤c≤1.1, 0.9≤e≤1.1),
$Li_cCO_eTi_{0.2}PO_4$ (0.9≤c≤1.1, 0.9≤e≤1.1);

$Li_cCO_eV_{0.01}PO_4$ (0.9≤c≤1.1, 0.9:≤e≤1.1),
$Li_cCO_eV_{0.02}PO_4$ (0.9≤c≤1.1, 0.9≤e≤1.1),
$Li_cCO_eV_{0.05}PO_4$ (0.9≤c≤1.1, 0.9≤e≤1.1),
$Li_cCO_eV_{0.08}PO_4$ (0.9≤c≤1.1, 0.9≤e≤1.1),
$Li_cCo_eV_{0.09}PO_4$ (0.9≤c≤1.1, 0.9≤e≤1.1),
$Li_cCO_eV_{0.1}PO_4$ (0.9≤c≤1.1, 0.9≤e≤1.1);

$Li_cCO_eV_{0.11}PO_4$ (0.9≤c≤1.1, 0.9≤e≤1.1),
$Li_cCO_eV_{0.12}PO_4$ (0.9≤c≤1.1, 0.9≤e≤1.1),
$Li_cCO_eV_{0.13}PO_4$ (0.9≤c≤1.1, 0.9≤e≤1.1),
$Li_cCO_eV_{0.14}PO_4$ (0.9≤c≤1.1, 0.9≤e≤1.1),
$Li_cCO_eV_{0.15}PO_4$ (0.9≤c≤1.1, 0.9≤e≤1.1),
$Li_cCO_eV_{0.2}PO_4$ (0.9≤c≤1.1, 0.9≤e≤1.1);

$Li_cCo_eCr_{0.01}PO_4$ (0.9≤c≤1.1, 0.9≤e≤1.1),
$Li_cCO_eCr_{0.02}PO_4$ (0.9≤c≤1.1, 0.9≤e≤1.1),
$Li_cCo_eCr_{0.05}PO_4$ (0.9≤c≤1.1, 0.9≤e≤1.1),
$Li_cCo_eCr_{0.08}PO_4$ (0.9≤c≤1.1, 0.9 ≤e≤1.1),
$Li_cCo_eCr_{0.09}PO_4$ (0.9≤c≤1.1, 0.9≤e≤1.1),
$Li_cCo_eCr_{0.1}PO_4$ (0.9≤c≤1.1, 0.9 ≤e≤1.1);

$Li_cCo_eCr_{0.11}PO_4$ (0.9≤c≤1.1, 0.9≤e≤1.1),
$Li_cCo_eCr_{0.12}PO_4$ (0.9≤c≤1.1, 0.9≤e≤1.1),
$Li_cCo_eCr_{0.13}PO_4$ (0.9≤c≤1.1, 0.9≤e≤1.1),
$Li_cCo_eCr_{0.14}PO_4$ (0.9≤c≤1.1, 0.9 ≤e≤1.1),
$Li_cCo_eCr_{0.15}PO_4$ (0.9<≤c≤1.1, 0.9≤e≤1.1), or
$Li_cCo_eCr_{0.2}PO_4$ (0.9≤c≤1.1, 0.9≤e≤1.1), or a combination thereof.

A combination comprising at least one of the foregoing may be used.

The first crystalline phase included in the lithium-transition metal composite phosphate may have, for example, a crystal structure that belongs to an orthorhombic crystal system, and the second crystalline phase may have a crystal structure that belongs to a triclinic crystal system.

The first crystalline phase included in the lithium-transition metal composite phosphate may have, for example, a crystal structure that belongs to the Pnma space group, and the second crystalline phase may have, for example, a crystal structure that belongs to the P-1 space group. The crystal system and space group included in the first crystalline phase and the second crystalline phase may be identified by X-ray diffraction (XRD) analysis.

Referring to FIGS. 1A to 1F, a primary peak is observed at a diffraction angle of 25.8°2θ±0.5°2θ obtained in X-ray diffraction analysis using CuKα radiation for the lithium-transition metal composite phosphate including the first crystalline phase and the second crystalline phase. In addition, a secondary peak is observed at a diffraction angle of 28.3°2θ±0.5°2θ obtained from X-ray diffraction analysis using CuKα radiation for the lithium-transition metal-phosphorus composite oxide including the first crystalline phase and the second crystalline phase. In addition, a ratio (P2/P1) of an intensity (P1) of the primary peak and an intensity (P2) of the secondary peak obtained from the X-ray diffraction analysis using CuKα radiation for the lithium-transition metal composite phosphate including the first crystalline phase and the second crystalline phase is about 0.01 to about 1 or about 0.1 to about 1.

In the present description, the "primary peak" indicates a peak having a maximum intensity, and the "minor peak" indicates a peak having less intensity than the primary peak.

The lithium-transition metal composite phosphate including the first crystalline phase and the second crystalline phase may have an average discharge voltage of, for example, 4.5 V or more. The lithium-transition metal composite phosphate including the first crystalline phase and the second crystalline phase may have an average discharge voltage of, for example, about 4.5 V to about 6.5 V, about 4.5 V to about 6.0 V, about 4.5 V to about 5.5 V, or about 4V to about 5.0 V. When the lithium-transition metal composite phosphate including the first crystalline phase and the second crystalline phase has a high average discharge voltage in these ranges, a lithium battery including the lithium-transition metal composite phosphate having a first crystalline phase and a second crystalline phase may have an improved energy density. The average discharge voltage may be, for example, a voltage obtained by dividing a value for an integrated area of a profile in a discharge profile graph for discharge voltage and specific capacity by discharge capacity.

The lithium-transition metal composite phosphate including the first crystalline phase and the second crystalline phase may have a specific capacity of, for example, 50 mAh/g or more, or 60 mAh/g or more. The lithium-transition metal composite phosphate including the first crystalline phase and the second crystalline phase may have a specific capacity of, for example, about 50 mAh/g to about 160 mAh/g, about 50 mAh/g to about 130 mAh/g, or about 50 mAh/g to about 100 mAh/g. When the lithium-transition metal composite phosphate including the first crystalline phase and the second crystalline phase has a high specific capacity in these ranges, a lithium battery including the lithium-transition metal composite phosphate having a first crystalline phase and a second crystalline phase may have an improved energy density. The specific capacity may be, for example, an initial discharge capacity.

According to another embodiment, provided is a positive electrode including the composite positive electrode active material described above.

The positive electrode includes, for example, a positive electrode current collector and a positive electrode active material layer positioned on one or both surfaces of the positive electrode current collector. The positive electrode active material layer includes the composite positive electrode active material described above. Depending on a method of preparing the positive electrode, the positive electrode current collector may be omitted.

The composite positive electrode active material included in the positive electrode active material layer may be in an amount of, for example, about 30 weight percent (wt %) to about 100 wt %, or about 50 wt % to about 100 wt %, with respect to a total weight of the positive electrode active material layer.

The positive electrode active material layer may or may not further include a conductive material, an additive to improve electronic or ionic conductivity, and a binder.

The conductive material included in the positive electrode active material layer may be contained in an amount of 0 wt % to about 40 wt %, about 0.1 wt % to about 30 wt %, about 1 wt % to about 20 wt %, or about 1 wt % to about 10 wt %, based on a total weight of the positive electrode active material layer.

The binder included in the positive electrode active material layer may be contained in an amount of 0 wt % to about 30 wt %, about 0.1 wt % to about 20 wt %, or about 1 wt % to about 10 wt %, based on a total weight of the positive electrode active material layer.

The types of the conductive material and the binder included in the positive electrode active material layer are not particularly limited, and any suitable conductive material and any suitable binder may be used.

The positive electrode includes the composite positive electrode active material described above, and thus may provide a high average discharge voltage.

According to another embodiment, provided is a secondary battery including a positive electrode; a negative electrode; and an electrolyte positioned between the positive electrode and the negative electrode, the positive electrode including the composite positive electrode active material described herein.

The secondary battery can be, for example, a lithium secondary battery or an all-solid battery. The secondary battery may be, for example, a multi-layer-ceramic (MLC) battery or a thin-film battery.

The multi-layer-ceramic battery may include, for example, a plurality of positive electrode layers; a plurality of negative electrode layers alternately positioned between the plurality of positive electrode layers; and a plurality of solid electrolyte layers alternately positioned between and separating positive electrode layers and negative electrode layers of the plurality of positive electrode layers and the plurality of negative electrode layers. At least one of the plurality of the positive electrode layers can comprise the cathode active material.

The multi-layer-ceramic battery can include a solid electrolyte, for example, an oxide-based solid electrolyte. In an embodiment, at least one of the plurality of the solid electrolyte layers includes the oxide-based solid electrolyte.

The negative electrode included in the multi-layer-ceramic battery may include, for example, a negative electrode active material comprising lithium metal phosphate, lithium metal oxide, metal oxide, or a combination thereof.

The multi-layer-ceramic battery can be, for example, a sintered product of a laminate in which a positive electrode active material precursor, a negative electrode active material precursor, and a solid electrolyte precursor are sequentially stacked, or a sintered product of a laminate in which a positive electrode active material, a negative electrode active material, and a solid electrolyte are sequentially stacked.

The multi-layer-ceramic battery can have, for example, a laminate structure in which a plurality of unit cells comprising a positive electrode layer including a positive electrode active material layer; a solid electrolyte layer; and a negative electrode layer including a negative electrode active material layer are sequentially arranged. The unit cells are stacked in such a way that the positive electrode active material layer of one unit cell faces the negative electrode active material layer of another unit cell. The multi-layer-ceramic battery may further include, for example, a positive electrode current collector and/or a negative electrode current collector. When the multi-layer-ceramic battery includes a positive electrode current collector, the positive electrode active material layer may be positioned on one or both surfaces of the positive electrode current collector. When the multi-layer-ceramic battery includes a negative electrode current collector, the negative electrode active material layer may be positioned on one or both surfaces of the negative electrode current collector. When the multi-layer-ceramic battery further includes a positive electrode current collector and/or a negative electrode current collector, a battery may have further improved high rate characteristics.

In the multi-layer-ceramic battery, unit cells can be stacked by providing a current collector layer on one or both of the uppermost layer and the lowermost layer of a laminate or by positioning a current collector layer such as a metal layer within the laminate.

The multi-layer-ceramic battery or the thin-film battery can be, for example, a small or ultra-small battery applicable as an application power source for the Internet of Things (IoT) or a wearable device power source.

The multi-layer-ceramic battery or the thin-film battery is applicable to medium-and-large-sized devices, for example, an electric vehicle (EV), an energy storage system, etc.

The secondary battery can be, for example, a multi-layer-ceramic solid battery having at least a first unit cell and a second unit cell each provided with a positive electrode layer, a solid electrolyte layer, and a negative electrode layer that are stacked in order, and an inner current collector positioned between the first unit cell and the second unit cell in contact with the positive electrode layer of each of the first unit cell and the second unit cell, or in contact with the negative electrode layer of each of the first unit cell and the second unit cell.

The negative electrode active material of the negative electrode active material layer can comprise $Li_{4/3}Ti_{5/3}O_4$, $LiTiO_2$, $LiM1_sM2_tO_u$ (M1 and M2 are transition metals, and s, t, and u are arbitrary positive numbers), $TiO_x$ (0<x≤3), $Li_xV_2(PO_4)_3$ (0<x≤5), or a combination thereof. The negative electrode active material is, in particular, $Li_{4/3}Ti_{5/3}O_4$, or LiTiO.

Any suitable current collector layer for a positive electrode current collector or a negative electrode current collector may be used. The current collector layer may be made of, for example, any suitable metal such as Ni, Cu, Ag, Pd, Au, or Pt. The current collector layer may be made of an alloy including, for example, any of Ni, Cu, Ag, Pd, Au, or Pt. The alloy may be, for example, two or more alloys selected from Ni, Cu, Ag, Pd, Au, or Pt. The alloy may be, for example, an Ag/Pd alloy. These metals and alloys may be composed of one or a mixture of two or more thereof. The current collector layer as the positive electrode current collector and the current collector layer as the negative electrode current collector may be made of the same material or different materials. The alloy or mixed powder containing Ag and Pd may continuously and arbitrarily change the melting point from the silver melting point (962° C.) to the palladium melting point (1550° C.) based on the mixing ratio, and thus it is possible to match the melting point of the alloy or mixed powder containing Ag and Pd to the batch-firing temperature, and the current collector obtained can be highly electron-conductive, and thus may possibly prevent an increase in the internal resistance of a battery.

The solid electrolyte or the solid electrolyte layer can contain an ion-conductive inorganic material, and for example, an oxide-based solid electrolyte may be used.

The oxide-based solid electrolyte is, for example, $Li_{1+x+y}Al_xTi_{2-x}Si_yP_{3-y}O_{12}$ (0<x<2, 0≤y<3), $BaTiO_3$, $Pb(Zr_xTi_{1-x})O_3$ (PZT) (0≤x≤1), $Pb_{1-x}La_xZr_{1-y}Ti_yO_3$ (PLZT, 0≤x<1, 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $Li_{1+x+y}(Al_aGa_{1-a})_x(Ti_bGe_{1-b})_{2-x}Si_yP_{3-y}O_{12}$ (0≤x≤1, 0≤y≤1, 0≤a≤1, and 0≤b≤1), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride-based glass ($Li_xN_y$, 0<x<4, 0<y<2), $SiS_2$ ($Li_xSi_yS_z$, 0<x<3,0<y<2, 0<z<4), $P_2S_5$-based glass ($Li_xP_yS_z$, 0<x<3, 0<y<3, 0<z<7), $Li_2O$, LiF, LiGH, $Li_2CO_3$, $LiAlO_2$, a $Li_2O$—$Al_2O_3$—$SiO_2$—$P_2O_5$—$TiO_2$—$GeO_2$-based ceramic, a garnet-type ceramics of the formula $Li_{3+x}La_3M_2O_{12}$ (where M=Te, Nb, Zr, or a combination thereof)(x is an integer of 1 to 10), or a combination thereof.

In an embodiment, the solid electrolyte may comprise $Li_{3.25}Al_{0.25}SiO_4$, $Li_3PO_4$, $LiP_xSi_yO_z$ (where, x, y, and z are independently arbitrary positive numbers), or a combination thereof. The solid electrolyte can be, for example, $Li_{3.5}P_{0.5}Si_{0.5}O_4$.

Figure 3:
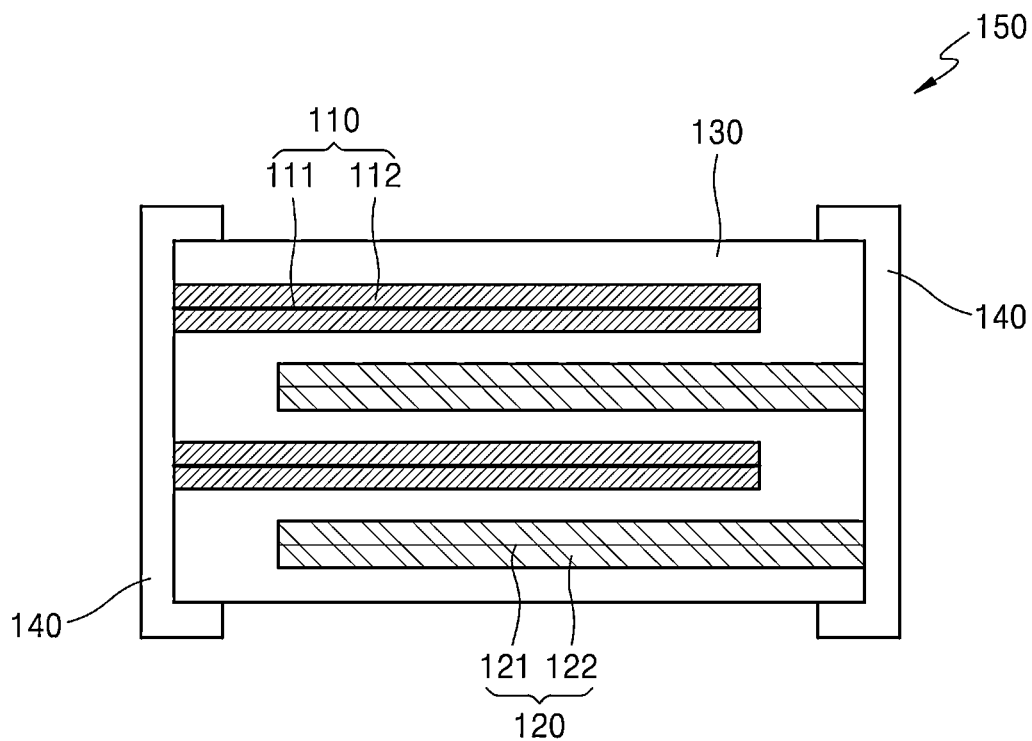
FIG. 3 schematically shows an embodiment of a structure of a multi-layer-ceramic type battery.

FIG. 3 schematically shows an embodiment of a cross-sectional structure of a multi-layer-ceramic (MLC) solid battery.

Referring to FIG. 3, the MLC battery may be manufactured by sequentially stacking a positive electrode, a solid electrolyte, and a negative electrode, and then subjecting the resultant stack to heat treatment to laminate the electrodes and electrolyte together. The heat treatment may be at 200° C. to 1200° C., 400° C. to 1000° C., or 600° C. to 800° C.

Referring to FIG. 3, a positive electrode active material layer 112 containing a positive electrode active material according to an embodiment is positioned on one or both sides of a positive electrode current collector 111 to form a positive electrode 110.

A negative electrode active material layer 122 is stacked on one or both sides of a negative electrode current collector 121 to form a negative electrode 120. A solid electrolyte 130 is positioned between the positive electrode 110 and the negative electrode 120. Outer electrodes 140 are formed at both ends of a battery body 150. The outer electrodes 140 are connected to the positive electrode 110 and the negative electrode 120. The ends of the external electrodes 140 are exposed to the outside of the battery body 150, and serve as external terminals electrically connecting the positive electrode 110, the negative electrode 120, and an external device. Any one of the pair of outer electrodes 140 is connected to the positive electrode 110 having one end exposed to the outside of the battery body 150, and the other one is connected to the negative electrode 120 having the other end exposed to the outside of the battery body 150.

Figure 4:
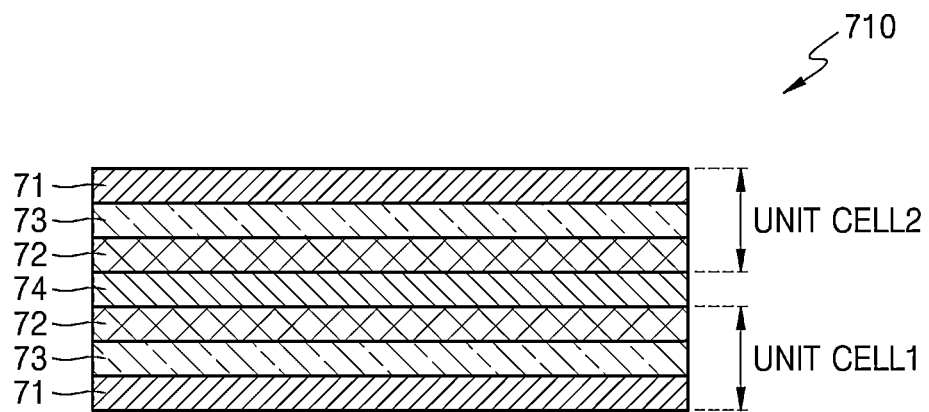
FIGS. 4 to 5 schematically show another embodiment of a structure of a secondary battery.
Figure 5:
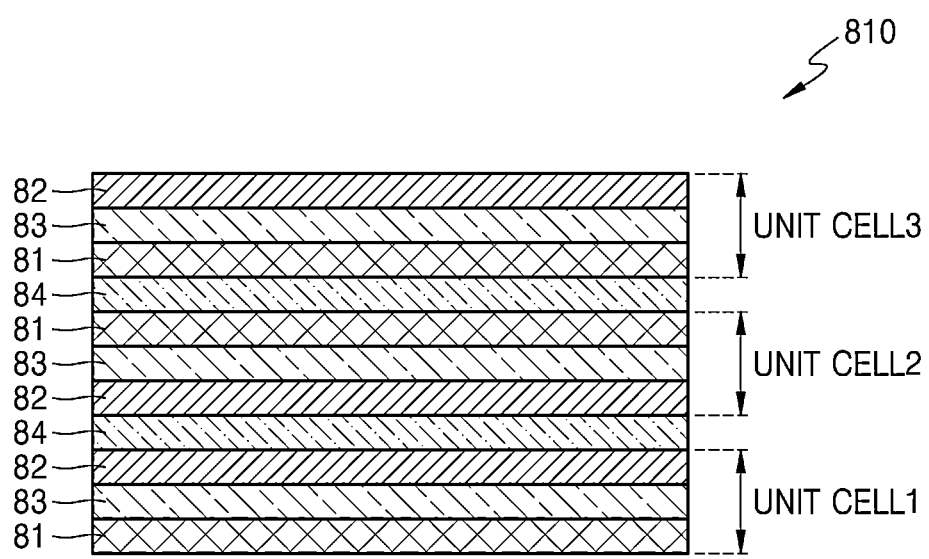

FIGS. 4 to 5 schematically show an embodiment of a cross-sectional structure of a multi-layer-ceramic solid battery.

As shown in FIG. 4, in a multi-layer-ceramic solid battery 710, a unit cell 1 and a unit cell 2 are stacked through an inner current collector layer 74. Each of the unit cell 1 and the unit cell 2 has a positive electrode layer 71, a solid electrolyte layer 73, and a negative electrode layer 72, which are sequentially stacked.

The positive electrode layer 71 contains the positive electrode active material according to an embodiment.

The unit cell 1, the unit cell 2, and the inner current collector layer 74 are stacked such that the negative electrode layer 72 of the unit cell 2 is adjacent to one side of the internal current collector layer 74 (the upper surface in FIG. 4), and the negative electrode layer 72 of the unit cell 1 is adjacent to the other side (the lower surface in FIG. 4) of the inner current collector layer 74.

In FIG. 4, the inner current collector layer 74 is positioned to be in contact with the negative electrode layer 72 of each of the unit cell 1 and the unit cell 2, and although not shown the inner current collector 74 may be positioned to be in contact with the positive electrode layer 71 of the unit cell 1 and the unit cell 2. The inner current collector layer 74 includes an electron-conductive material.

The inner current collector layer 74 may further include an ion-conductive material. The further inclusion of the ion-conductive material can improve voltage stabilization characteristics.

The same polarity is positioned on both sides of the inner current collector layer 74 in the multi-layer-ceramic solid battery 710, thus a monopolar multi-layer-ceramic solid battery 710 in which a plurality of unit cells are connected in parallel with the inner current collector layer 74 therebetween may be obtained. Accordingly, a high-capacity multi-layer-ceramic solid battery 710 may be obtained.

In the multi-layer-ceramic solid battery 710, the inner current collector layer 74 disposed between the unit cell 1 and the unit cell 2 includes an electron-conductive material, and thus may electrically connect the two adjacent unit cells in parallel, and also ionically connect the positive electrode layer 71 or the negative electrode layer 72 in the two adjacent unit cells. Accordingly, the potential of the positive electrode layer 71 or the negative electrode layer 72 adjacent to each other through the inner current collector layer 74 may be averaged, resulting in a stable output voltage.

In addition, the unit cells constituting the multi-layer-ceramic solid battery 710 may be electrically connected in parallel by eliminating external current collecting members such as a tab. Accordingly, a multi-layer-ceramic solid battery 710 having excellent space utilization and cost-effectiveness may be obtained.

Referring to FIG. 5, a laminate includes a positive electrode layer 81, a negative electrode layer 82, a solid electrolyte layer 83, and an inner current collector layer 84. The laminate is stacked and thermo-compressed to obtain a multi-layer-ceramic solid battery laminate 810. The positive electrode layer 81 is composed of one sheet for the positive electrode layer. The negative electrode layer 82 is composed of two sheets for the negative electrode layer. The positive electrode layer 81 contains the positive electrode active material according to an embodiment.

Figure 6A:
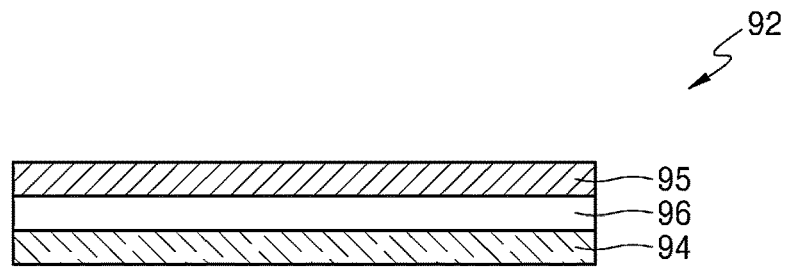
FIGS. 6A and 6B schematically show yet another embodiment of a structure of a secondary battery.
Figure 6B:
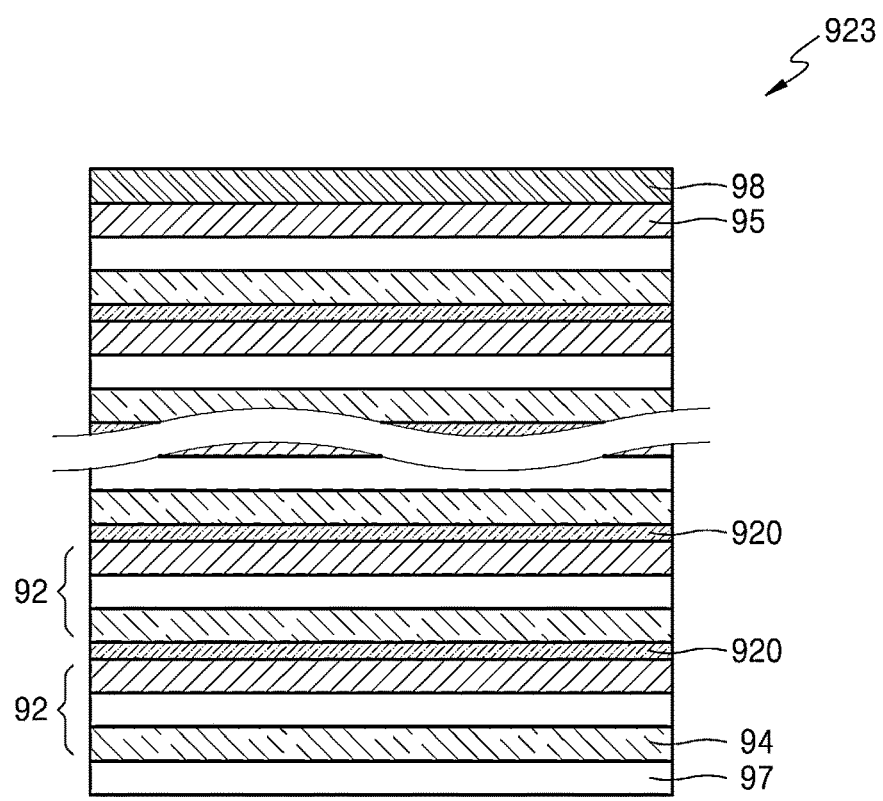

FIGS. 6A and 6B show another embodiment of a laminate of an all-solid secondary battery. The positive electrode active material layer of FIGS. 7A and 7B includes the positive electrode active material according to an embodiment.

FIG. 6A shows a structure of a unit cell 92, the most basic one constituting an all-solid secondary battery. The unit cell 92 has a structure in which a positive electrode active material layer 94, a solid electrolyte layer 96, and a negative electrode active material layer 95 are sequentially stacked.

FIG. 6B shows a structure of a laminate 923 constituting an all-solid secondary battery.

In the all-solid secondary battery, a positive extraction electrode in contact with the positive electrode active material layer is provided at a lower end, and a negative extraction electrode in contact with the negative electrode active material layer is provided at an upper end. In this description, the upper end and the lower end indicate a relative positional relationship.

Referring to FIG. 6B, the laminate 923 has a structure in which a plurality of unit cells 92 are stacked in such a way that each of the positive electrode active material layer 94 and the negative electrode active material layer 95 face each other. A current collector layer is positioned on each of the uppermost layer and the lowermost layer of the laminate 923. One of the uppermost current collector layer or the lowermost current collector layer is connected to the positive electrode active material layer to serve as a positive electrode current collector, and the other is connected to the negative electrode active material layer to serve as a negative electrode current collector. The lowermost current collector layer 97 comes in contact with the positive electrode active material layer 94 to serve as a positive electrode current collector, and the uppermost current collector layer 98 comes into contact with the negative electrode active material layer 95 to serve as a negative electrode current collector. The current collector layer may serve as an extraction electrode.

In FIG. 6B, the lowermost current collector layer 97 may serve as a positive extraction electrode, and the uppermost current collector layer 98 may serve as a negative extraction electrode. Alternatively, the extraction electrode may be separately provided on a current collector layer. For example, a positive extraction electrode in contact with the current collector layer 97 may be provided at a lower end, and a negative extraction electrode in contact with the current collector layer 98 may be provided at an upper end.

In FIG. 6B, the laminate 923 has a stack structure with a metal layer 920 between the unit cells 92. Such an arrangement may allow ions to move within individual cell units, and thus the laminate 923 may serve as a series-type all-solid secondary battery. The laminate 923 of FIG. 7B is provided with a current collector layer, but the current collector layer is optional as described above.

In the laminate 923 of the all-solid secondary battery, when the number of unit cells 92 is two or more, a so-called series-type all-solid secondary battery may be formed. The number of unit cells may be selected based on the desired capacity or voltage of the all-solid secondary battery.

Alternatively, the secondary battery is, for example, an all-solid secondary battery including a positive electrode layer including a positive electrode active material layer, a negative electrode layer including a negative electrode current collector layer, a first negative electrode active material layer, a third negative electrode active material layer, or a combination thereof, and a solid electrolyte layer positioned between the positive electrode layer and the negative electrode layer, wherein the all-solid secondary battery includes a lithium-transition metal composite phosphate layer having a first crystalline phase with a composition represented by Formula 1 and having an olivine structure, and a second crystalline phase with a composition represented by Formula 2 and having a pyrophosphate-containing structure, the second crystalline phase being in an amount of greater than 0 and not to greater than 50 mole percent with respect to a total of the first crystalline phase and second crystalline phase.

$$Li_xM1_yPO_4 \quad \text{Formula 1}$$

$$Li_aM2_b(P_2O_7)_4. \quad \text{Formula 2}$$

wherein in Formulas 1 and 2, 0.9≤x≤1.1, 0.9≤y≤1.1, 5.5≤a≤6.5, and 4.8≤b≤5.2, and M1 and M2 are each independently an element from Groups 3 to 11 in the 4th period of the Periodic Table of the Elements, or a combination thereof.

The first negative electrode active material layer can include a carbon-based negative electrode active material, a metal or metalloid negative electrode active material, or a combination thereof.

The carbon-based negative electrode active material can include amorphous carbon and crystalline carbon, and the metal or metalloid negative electrode active material can include gold (Au), platinum (Pt), palladium (Pd), silicon (Si), silver (Ag), aluminum (Al), bismuth (Bi), tin (Sn), zinc (Zn), or a combination thereof.

The all-solid secondary battery can further include, for example, a second negative electrode active material layer positioned between the negative electrode current collector and the first negative electrode active material layer and/or between the solid electrolyte layer and the first negative electrode active material layer. The second negative electrode active material layer can be a metal layer containing lithium or a lithium alloy.

In the all-solid secondary battery, for example, a third negative electrode active material layer can be a metal layer containing lithium or a lithium alloy.

Figure 7:
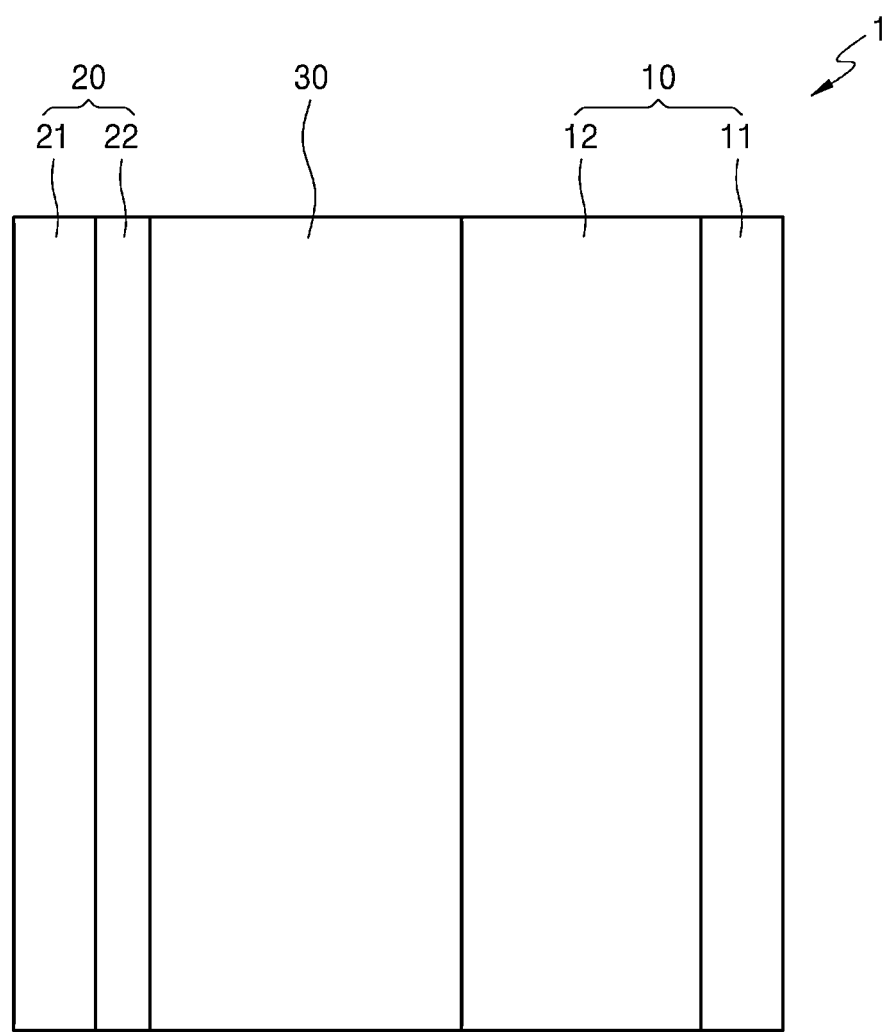
FIGS. 7 to 9 schematically show an embodiment of a structure of an all-solid secondary battery.
Figure 8:
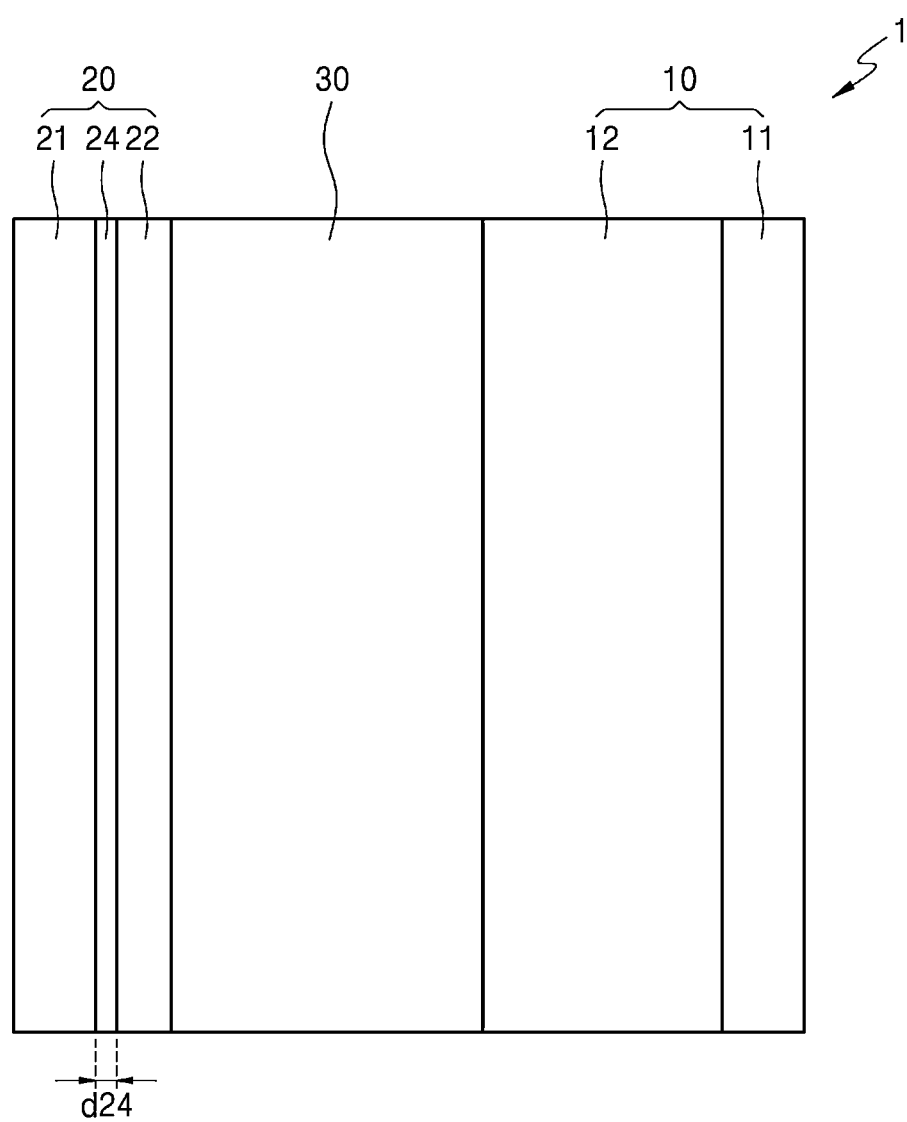
Figure 9:
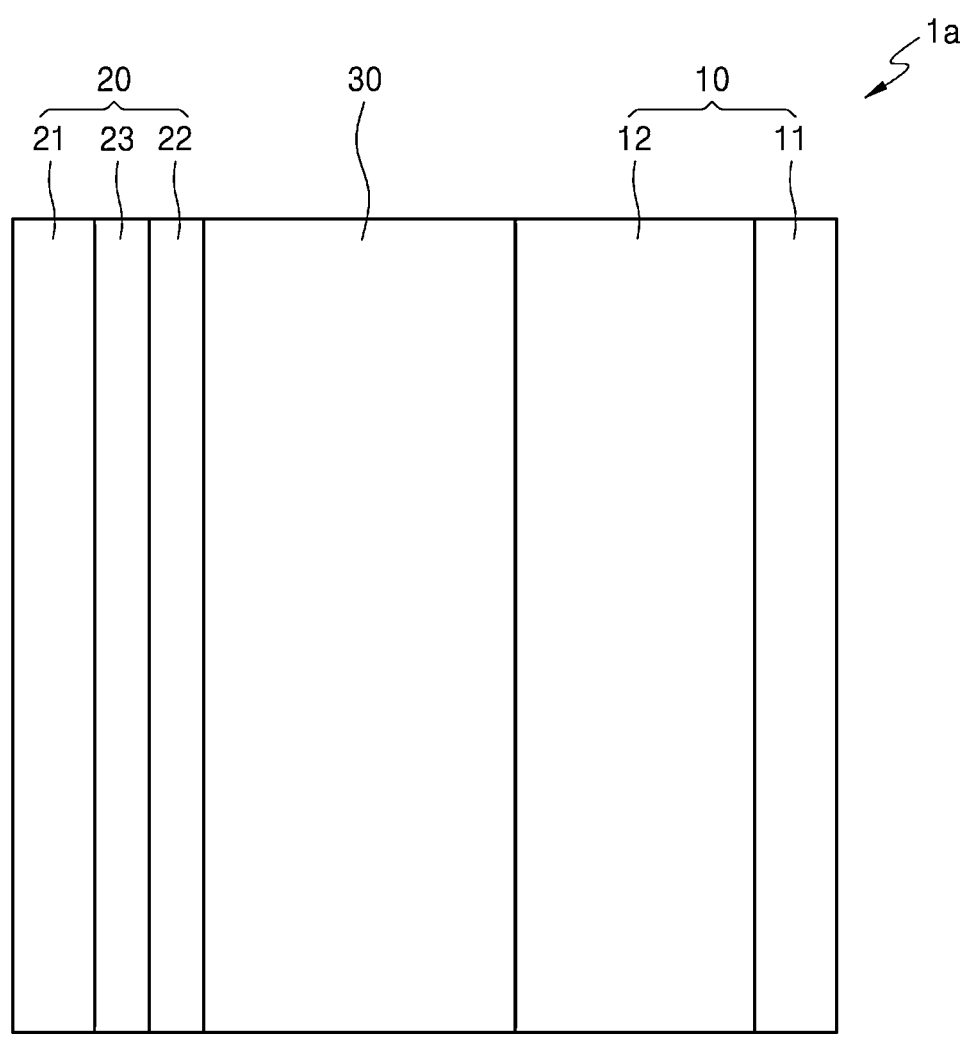

Referring to FIGS. 7 to 9, an all-solid secondary battery 1 includes a negative electrode layer 20 including a negative electrode current collector layer 21 and a first negative electrode active material layer 22; a positive electrode layer 10 including a positive electrode current collector layer 11 and a positive electrode active material layer 12; and a solid electrolyte layer 30 positioned between the negative electrode layer 20 and the positive electrode layer 10. The positive electrode layer 10 may contain a solid electrolyte. The positive electrode active material layer 12 of FIGS. 7 to 9 includes a composite positive electrode active material according to an embodiment. The positive electrode layer may contain, for example, the positive electrode active material described herein, a solid electrolyte, and a conductive material.

Negative Electrode Layer

Referring to FIGS. 7 to 9, the negative electrode layer 20 includes a negative electrode current collector layer 21 and a first negative electrode active material layer 22, and the first negative electrode active material layer 22 includes an negative electrode active material. The negative electrode current collector layer 21 may be omitted.

The negative electrode active material included in the first negative electrode active material layer 22 can be, for example, in the form of particles. The negative electrode active material in the form of particles can have, for example, an average particle diameter of 4 microns (μm) or less, 3 μm or less, 2 μm or less, 1 μm or less, or 900 nanometers (nm) or less. The negative active material in the form of particles can have, for example, an average particle diameter of about 10 nm to about 4 μm, about 10 nm to about 2 μm, about 10 nm to about 1 μm, or about 10 nm to about 900 nm. When the negative electrode active material has an average particle diameter within these ranges, reversible absorbing and/or desorbing of lithium upon charging/discharging may further be facilitated. The average particle diameter of the negative active material may be a median diameter (D50) measured using a laser type particle size distribution meter.

The negative active material included in the first negative active material layer 22, can include, for example a carbon-based negative active material, a metal or metalloid negative active material, or a combination thereof.

The carbon-based negative active material is particularly amorphous carbon. Examples of the amorphous carbon may include carbon black (CB), acetylene black (AB), furnace black (FB), KETJEN black (KB), or graphene, but the embodiment is not limited thereto, and any suitable material classified as amorphous carbon in the art may be used. The amorphous carbon refers to carbon having no crystallinity or a fairly low crystallinity, which may be distinct from crystalline carbon or graphite-based carbon.

The metal or metalloid negative electrode active material may include gold (Au), platinum (Pt), palladium (Pd), silicon (Si), silver (Ag), aluminum (Al), bismuth (Bi), tin (Sn), zinc (Zn), or a combination thereof but the embodiment is not limited thereto, and any suitable material available as a metal negative electrode active material or a metalloid negative electrode active material that forms an alloy or a compound with lithium in the art may be used. For example, nickel (Ni) does not form an alloy with lithium and thus is not a metal negative electrode active material.

The first negative active material layer 22 can include a one-type negative electrode active material or a plurality of different types of negative electrode active materials among these negative electrode active materials. For example, the first negative active material layer 22 may include amorphous carbon alone or may include a metal or metalloid negative active material alone comprising gold (Au), platinum (Pt), palladium (Pd), silicon (Si), silver (Ag), aluminum (Al), bismuth (Bi), tin (Sn), zinc (Zn), or a combination thereof. Alternately, the first negative active material layer 22 can include a mixture of amorphous carbon and a metal or metalloid negative active material comprising gold (Au), platinum (Pt), palladium (Pd), silicon (Si), silver (Ag), aluminum (Al), bismuth (Bi), tin (Sn), zinc (Zn), or a combination thereof. A mixing ratio of the mixture of amorphous carbon, gold, etc. can be a weight ratio in a range of about 10:1 to about 1:2, about 5:1 to about 1:1, or about 4:1 to about 2:1, but is not necessarily limited thereto, and is selected based on the desired characteristics of an all-solid secondary battery 1. When the negative active material has the composition, cycle characteristics of the all-solid secondary battery 1 may further improve.

The negative electrode active material included in the first negative electrode active material layer 22 may include a mixture of first particles composed of amorphous carbon and second particles composed of a metal or metalloid. The metal or metalloid includes, for example, gold (Au), platinum (Pt), palladium (Pd), silicon (Si), silver (Ag), aluminum (Al), bismuth (Bi), tin (Sn), zinc (Zn), or a combination thereof. The metalloid is otherwise a semiconductor. The second particles can be present in an amount of about 8 wt % to about 60 wt %, about 10 wt % to about 50 wt %, about 15 wt % to about 40 wt %, or about 20 wt % to about 30 wt % with respect to a total weight of the mixture. When the second particles are contained in an amount within these ranges, cycle characteristics of the all solid secondary battery 1 may further improve.

The first negative electrode active material layer 22 can include, for example, a binder. Examples of the binder include styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, polymethylmethacrylate, but the embodiment is not limited thereto, and any suitable material which is used as a binder in the art may be used. The binder may be composed of a single binder or a plurality of different binders.

When the first negative electrode active material layer 22 contains a binder, the first negative electrode active material layer 22 can be stabilized on the negative electrode current collector 21. In addition, despite changes in volume and/or a relative position of the first negative electrode active material layer 22 in the process of charging/discharging, cracks of the first negative electrode active material layer 22 may be prevented. For example, when the first negative electrode active material layer 22 does not contain a binder, the first negative electrode active material layer 22 may be easily separated from the negative electrode current collector 21. The separation of the first negative electrode active material layer 22 from the negative electrode current collector 21 can expose the negative electrode current collector 21 and the exposed negative electrode current collector 21 may come into contact with the solid electrolyte layer 30, thus increasing the possibility of a short circuit. The first negative electrode active material layer 22 can be prepared, for example, by applying a slurry containing a material constituting the first negative electrode active material layer 22 onto the negative electrode current collector 21 and drying the slurry. When the binder is included in the first negative electrode active material layer 22, stable dispersion of the negative electrode active material in the slurry may be achieved. For example, when the slurry is applied onto the negative electrode current collector 21 through screen printing, the clogging of the screen (e.g., clogging due to the aggregate of the negative electrode active material) may be prevented.

The thickness d22 of the first negative electrode active material layer can be, for example, 50% or less, 30% or less, 10% or less, or 5% or less of the thickness d21 of the positive electrode active material layer. The thickness d22 of the first negative electrode active material layer can be, for example, about 1 μm to about 20 μm, about 2 um to about 10 um, or about 3 um to about 7 um. When the thickness d22 of the first negative electrode active material layer is within the above ranges, the all-solid secondary battery 1 can have excellent cycle characteristics.

The charging capacity of the first negative electrode active material layer 22 can be, for example, 50% or less, 40% or less, 30% or less, 20% or less, 10% or less, 5% or less, or 2% or less of the charging capacity of the positive electrode active material layer 12. The first negative active material layer 22 has, for example, a charging capacity of about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of the positive electrode active material layer 12. When the charging capacity of the first negative electrode active material layer 22 is within the above ranges, the all-solid secondary battery 1 can have excellent cycle characteristics. The charging capacity of the positive electrode active material layer 12 is obtained by multiplying charging specific capacity (mAh/g) of the positive electrode active material by weight of the positive electrode active material in the positive electrode active material layer 12. The negative electrode current collector 21 can be composed of a material that does not react with lithium, that is, does not form either an alloy or a compound with lithium. Materials constituting the negative electrode current collector 21 are, for example, copper (Cu), stainless steel, titanium (Ti), iron (Fe), cobalt (Co), nickel (Ni), etc., but are not necessarily limited thereto, and any suitable material used as an electrode current collector in the art may be used. The negative electrode current collector 21 may be composed of, for example, one of the above-described metals, or may be composed of an alloy of two or more metals or a coating material. The negative electrode current collector 21 is, for example, in the form of a plate or a foil.

The first negative electrode active material layer 22 may further include suitable additives used in an all-solid secondary battery 1, for example, a filler, a dispersant, an ion-conductive material, or a combination thereof.

Referring to FIG. 8, the all-solid secondary battery 1 further includes, for example, a thin film 24 containing an element capable of forming an alloy with lithium on the negative electrode current collector 21. The thin film 24 is positioned between the negative electrode current collector 21 and the first negative electrode active material layer 22. The thin film 24 can contain, for example, an element capable of forming an alloy with lithium. Elements capable of forming an alloy with lithium are gold, silver, zinc, tin, indium, silicon, aluminum, bismuth, etc., but are not limited thereto, and any element capable of forming an alloy with lithium in the art can be used. The thin film 24 is composed of one of these metals or an alloy of several types of metals. When the thin film 24 is positioned on the negative electrode current collector 21, for example, the plating form of a second negative electrode active material layer (not shown) plated between the thin film 24 and the first negative electrode active material layer 22 is further flattened, and the all-solid secondary battery 1 may have further improved cycle characteristics.

The thickness d24 of the thin film can be, for example, about 1 nm to about 800 nm, about 10 nm to about 700 nm, about 50 nm to about 600 nm, or about 100 nm to about 500 nm. When the thickness of the thin film is within these ranges, the all-solid battery may have excellent energy density and cycle characteristics. The thin film 24 may be positioned on the negative electrode current collector 21 through, for example, vacuum vapor deposition, sputtering, or plating, etc., but the embodiment is not necessarily limited to such methods, and any suitable method capable of forming the thin film 24 in the art may be used.

Referring to FIG. 9, the all-solid secondary battery 1 may further include, for example, a second negative electrode active material layer 23 positioned between the negative electrode current collector 21 and the solid electrolyte layer 30 through charging. The all-solid secondary battery 1 may further include, for example, a second negative electrode active material layer 23 plated between the negative electrode current collector 21 and the first negative electrode active material layer 22 through charging. The second negative electrode active material layer 23 can be, for example, a plated lithium layer.

The second negative electrode active material layer 23 can be a metal layer containing lithium or a lithium alloy. Therefore, as a metal layer containing lithium, the second negative electrode active material layer 23 serves as, for example, a lithium reservoir. Examples of the lithium alloy include a Li—Al alloy, a Li—Sn alloy, a Li—In alloy, a Li—Ag alloy, a Li—Au alloy, a Li—Zn alloy, a Li—Ge alloy, and a Li—Si alloy, but the embodiment is not limited thereto, and any suitable material that is used as a lithium alloy in the art can be used. The second negative active material layer 23 may be composed of one of the alloys or lithium, or may be composed of various alloys.

The thickness d23 of the second negative active material layer is not particularly limited, and can be, for example, about 10 um to about 200 um, about 10 um to about 100 um, or about 20 um to about 100 um. When the thickness d23 of the second negative electrode active material layer is within the above ranges, the all-solid secondary battery can have excellent cycle characteristics. The second negative electrode active material layer 23 may be, for example, a metal foil having a thickness in these ranges.

In the all-solid secondary battery 1, the second negative electrode active material layer 23 is, for example, positioned between the negative electrode current collector 21 and the first negative electrode active material layer 22 before assembly of the all-solid secondary battery 1, or plated between the negative electrode current collector 21 and the first negative electrode active material layer 22 through charging after assembly of the all-solid secondary battery 1.

When the second negative electrode active material layer 23 is positioned between the negative electrode current collector 21 and the first negative electrode active material layer 22 before assembly of the all-solid secondary battery 1, the second negative electrode active material layer 23 which is a metal layer containing lithium serves as a lithium reservoir. The all-solid secondary battery 1 including the second negative electrode active material layer 23 can have further improved cycle characteristics. For example, a lithium foil is positioned between the negative electrode current collector 21 and the first negative electrode active material layer 22 before assembly of the all-solid secondary battery 1.

When the second negative active material layer 23 is positioned through charging after assembly of the all-solid secondary battery 1, the all-solid secondary battery 1 does not include the second negative active material layer 23 when the all-solid secondary battery 1 is assembled, and thus energy density of the all-solid secondary battery 1 increases. For example, when charging the all-solid secondary battery 1, the all-solid secondary battery 1 is charged by exceeding the charging capacity of the first negative electrode active material layer 22. That is, the first negative active material layer 22 is overcharged. At the beginning of charging, lithium is absorbed into the first negative electrode active material layer 22. Accordingly the negative electrode active material included in the first negative electrode active material layer 22 forms an alloy or a compound with lithium ions transferred from the positive electrode layer 10. When the first negative active material layer 22 is overcharged, for example, lithium is plated between the rear surface of the first negative active material layer 22, that is, between the negative electrode current collector 21 and the first negative active material layer 22, and a metal layer corresponding to the second negative electrode active material layer 23 is formed by the plated lithium. The second negative electrode active material layer 23 can be a metal layer mainly composed of lithium (e.g., metallic lithium). The results are obtained, for example, when the negative electrode active material included in the first negative electrode active material layer 22 is composed of a material that forms an alloy or a compound with lithium. When being discharged, lithium in the first negative electrode active material layer 22 and the second negative electrode active material layer 23, that is, the metal layer, is ionized and moves towards the positive electrode layer 10.

Accordingly, lithium may be used as a negative electrode active material in the all-solid secondary battery 1. In addition, since the first negative electrode active material layer 22 covers the second negative electrode active material layer 23, the first negative electrode active material layer 22 serves as a protection layer for the second negative electrode active material layer 23, that is, the metal layer, and serves to prevent the growth of lithium dendrite plating as well. Therefore, a short circuit and capacity deterioration of the all-solid secondary battery 1 may be prevented, and as a result, the cycle characteristics of the all-solid secondary battery 1 improve. In addition, when the second negative active material layer 23 is disposed through charging after assembly of the all-solid secondary battery 1, the negative electrode current collector 21 and first negative electrode active material layer 22, and a region therebetween are for example Li-free regions having no lithium (Li) metal or lithium (Li) alloy at an initial state or post-discharge state of the all-solid secondary battery.

Referring to FIG. 9, the all-solid secondary battery 1 can have a structure in which the second negative electrode active material layer 23 is positioned on the positive electrode current collector 21, and the solid electrolyte layer 30 is directly positioned on the second negative electrode active material layer 23. The second negative electrode active material layer 23 can be, for example, a lithium metal layer or a lithium alloy layer.

Solid Electrolyte Layer

Referring to FIGS. 7 to 9, the solid electrolyte layer 30 may contain an oxide-based solid electrolyte.

The oxide-based solid electrolyte is, for example, $Li_{1+x+y}Al_xTi_{2-x}Si_yP_{3-y}O_{12}$ (0<x<2, 0≤y<3), $BaTiO_3$, $Pb(Zr_xTi_{1-x})O_3$ (PZT) (0≤x≤1), $Pb_{1-x}La_xZr_{1-y}Ti_yO_3$ (PLZT) (0≤x<1, 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (0<x<2, 0<y<3), $Li_xAl_yTi_z(PO_4)_3$ (0<x<2, 0<y<1, 0<z<3), $Li_{1+x+y}(Al_aGa_{1-a})_x(Ti_bGe_{1-b})_{2-x}Si_yP_{3-y}O_{12}$ (0≤x≤1, 0≤y≤1, 0≤a≤1, and 0≤b≤1), $Li_xLa_yTiO_3$ (0<x<2, 0<y<3), $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (M=Te, Nb, Zr, or a combination thereof, x is an integer of 1 to 10), or a combination thereof.

The oxide-based solid electrolyte is, for example, a Garnet-type solid electrolyte comprising $Li_7La_3Zr_2O_{12}$ (LLZO), $Li_{3+x}La_3Zr_{2-a}MaO_{12}$ (M doped LLZO, M=Ga, W, Nb, Ta, or Al, x is an integer of 1 to 10, 0.05≤a≤0.7), or a combination thereof.

According to an embodiment, the solid electrolyte layer includes an LLZO solid electrolyte.

The solid electrolyte layer 30 may contain, for example, $Li_7La_3Zr_2O_{12}$(LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, $Li_{6.5}La_3Zr_{1.5}Ta_{0.3}O_{12}$, or a combination thereof.

Positive Electrode Layer

The positive electrode layer 10 can include a positive electrode current collector 11 and a positive electrode active material layer 12.

The positive electrode current collector 11 can be, for example, a plate or a foil that is formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The positive electrode current collector 11 may be omitted.

The positive electrode active material layer 12 can contain a positive electrode active material and a solid electrolyte. The solid electrolyte included in the positive electrode layer 10 is similar to or different from a solid electrolyte included in the solid electrolyte layer 30. For details on the solid electrolyte, refer to the descriptions of the solid electrolyte layer 30. According to an embodiment, the solid electrolyte in the positive electrode layer may contain an oxide-based solid electrolyte.

The positive electrode layer 10 contains the positive electrode active material according to an embodiment.

The positive electrode active material may have, for example, particle shapes such as a true spherical shape, an elliptical shape, or a spherical shape. The particle diameter of the positive electrode active material is not particularly limited, and may be in a range applicable to a positive electrode active material of an all-solid secondary battery. The amount of the positive electrode active material of the positive electrode layer 10 is not particularly limited and may be in a range applicable to a positive electrode layer of an all-solid secondary battery.

The positive electrode layer 10 may further include additives such as, for example, a conductive material, a binder, a filler, a dispersant, an ion-conductive auxiliary agent or a combination thereof in addition to the positive electrode active material and the solid electrolyte described herein. Examples of the conductive material include graphite, carbon black, acetylene black, ketjen black, carbon fibers, metal powder, or a combination thereof. Examples of the binder include styrene-butadiene rubber (SBR), polytetrafluoroethylene, polyvinylidene fluoride, polyethylene, or a combination thereof. A coating agent, a dispersing agent, an ion-conductive auxiliary agent, etc. that may be blended into the positive electrode layer 10 can be materials that are generally used in an electrode of a solid secondary battery.

In an all-solid secondary battery manufacturing method, the solid electrolyte layer 30 is stacked on the positive electrode layer 10 and the negative electrode layer 20 is stacked thereon.

According to another embodiment, the solid electrolyte layer 30 may be prepared in the form of a sheet by applying a composition for forming a solid electrolyte layer on a separate substrate, drying the composition, and separating the dried composition from the substrate, or may be prepared in the form of a sheet including the substrate. Non-limiting examples of the substrate may include a polyethylene terephthalate film, a polyethylene nonwoven fabric, etc.

According to another embodiment, the solid electrolyte layer 30 may be formed by applying and drying or transferring a composition for forming the solid electrolyte layer on the positive electrode layer 10.

Thereafter, the positive electrode layer, the solid electrolyte layer, and the negative electrode layer are packaged with a packaging material, and then pressed to manufacture an all-solid battery. The pressing may be performed using roll press, hot press, warm isostatic press, or the like.

Mass production is achievable when using roll press or hot press upon the pressing, and a close interface may be formed in the process of compressing the electrode layer and the solid electrolyte layer.

Preparation of Negative Electrode Layer

A negative electrode active material, a conductive material, a binder, and a solid electrolyte, which are materials constituting a first negative electrode active material layer 22 can be added to a polar solvent or a non-polar solvent to prepare a slurry. The prepared slurry is applied onto a negative electrode current collector 21 and dried to prepare a first laminate. Thereafter, the dried first laminate is pressed to prepare a negative electrode layer 20. The pressing is, for example, roll press, flat press, etc., but is not necessarily limited to these methods, and any press used in the art can be used.

The Pressing May be Skipped.

The negative electrode layer can include a negative electrode current collector and a first negative electrode active material layer containing a negative electrode active material positioned on the negative electrode collector, the negative electrode active material includes a carbon-based negative electrode active material, a metal or metalloid negative electrode active material, or a combination thereof, and the carbon-based negative electrode active material can include amorphous carbon, crystalline carbon, or a combination thereof. In addition, the metal or metalloid negative electrode active material can include gold (Au), platinum (Pt), palladium (Pd), silicon (Si), silver (Ag), aluminum (Al), bismuth (Bi), tin (Sn), zinc (Zn), or a combination thereof.

The negative electrode layer can further include a second negative electrode active material layer positioned between the negative electrode current collector and the first negative electrode active material layer, and/or between the solid electrolyte layer and the first negative electrode active material layer, and the second negative electrode active material layer can be a metal layer including lithium or a lithium alloy.

Preparation of Positive Electrode Layer

A positive electrode active material, a conductive material, a binder, and a solid electrolyte, which are materials constituting a positive electrode active material layer 12 can be added to a non-polar solvent to prepare a slurry. The positive electrode active material according to an embodiment may be used as the positive electrode active material. The prepared slurry is applied onto a positive electrode current collector 11 and dried. The obtained laminate is pressed to prepare a positive electrode layer 10. The pressing is, for example, roll press, flat press, hydrostatic press, etc., but is not necessarily limited to these methods, and any suitable pressing method used in the art can be used. The pressing may be skipped. Alternatively, a positive electrode layer 10 is prepared by compacting and molding a mixture of materials constituting the positive electrode active material layer 12 into a pellet form or extending (molding) the mixture into a sheet form. When the positive electrode layer 10 is prepared in this way, the positive electrode current collector 11 may be omitted.

Preparation of Solid Electrolyte Layer

The solid electrolyte layer 30 is prepared through, for example, a solid electrolyte formed of an oxide-based solid electrolyte material.

Preparation of all-Solid Secondary Battery

The positive electrode layer 10, the negative electrode layer 20, and the solid electrolyte layer 30 prepared through the disclosed method are stacked and pressed to manufacture an all-solid secondary battery 1 comprising the positive electrode layer 10, the negative electrode layer 20, and the solid electrolyte layer 30 disposed between the positive electrode layer 10 and the negative electrode layer 20.

For example, the solid electrolyte layer 30 is positioned on the positive electrode layer 10 to prepare a second laminate. Thereafter, the negative electrode layer 20 is positioned on the second laminate such that the solid electrolyte layer 30 is in contact with the first negative electrode active material layer to manufacture an all-solid secondary battery 1.

The configuration and manufacturing method of the all-solid secondary battery 1 described herein is an example of an embodiment, and component members and manufacturing procedures may be appropriately changed.

The all-solid secondary battery 1 may be used in a small ITS (Intelligent Transportation System) or a large electric vehicle according to the capacity and size of a battery.

A compound represented by Formula 1 according to another embodiment may be prepared through a wet method or a dry method. Hereinafter, a method of preparing the compound of Formula 1 according to a dry method will be described.

First, an M1 precursor, an M2 precursor, a lithium precursor, and a phosphorus precursor are mixed to prepare a precursor mixture.

In the precursor mixture, a molar ratio of the sum of M1 and M2 to phosphorus (P) may be, for example, about 1:0.8 to about 1:1.3. When the molar ratio of the sum of M1 and M2 to phosphorus (P) is in such a range, a lithium-transition metal composite phosphate including a composite phase of the first crystalline phase and the second crystalline phase may be obtained in high yield.

The mixing may be, for example, performed through mechanical milling. Upon the mechanical milling, if desired, a solvent may be added. The solvent may be, for example, acetone, ethanol, water, ethylene glycol, isopropanol, or a combination thereof. The solvent is in an amount of about 50 to about 1,000 parts by weight, for example about 100 to about 300 parts by weight, with respect to 100 parts by weight of a total weight of the precursor mixture. When a solvent is added, the mixing of each precursor may be performed more uniformly.

The mechanical milling may be performed according to methods known in the art. Examples of the milling may include, for example, a ball mill, an air jet mill, a bead mill, a roll mill, a planetary mill, and the like.

The lithium precursor may be, for example, lithium oxide, lithium carbonate, lithium chloride, lithium sulfide, lithium nitrate ($LiNO_3$), lithium phosphate, lithium hydroxide, or a combination thereof.

Examples of the phosphorus precursor include $(NH_4)_2HPO_4$, $(NH_4)H_2PO_4$, $LiPO_3$, $LiH_2PO_4$, or a combination thereof.

The M1 precursor is, for example, M1-containing oxide, M1-containing carbonate, M1-containing chloride, M1-containing phosphate, M1-containing hydroxide, M1-containing nitrate, M1-containing hydroxide, M1-containing oxalate, or a combination thereof. The M2 precursor is, for example, M2-containing oxide, M2-containing carbonate, M2-containing chloride, M2-containing phosphate, M2-containing hydroxide, M2-containing nitrate, M2-containing hydroxide, M2-containing oxalate, or a combination thereof.

Examples of the M1 precursor or the M2 precursor include cobalt oxide, cobalt sulfate, cobalt hydroxide, cobalt nitrate, cobalt oxalate, nickel oxide, nickel sulfate, nickel hydroxide, nickel nitrate, nickel oxalate, manganese oxide, manganese sulfate, manganese hydroxide, manganese nitrate, manganese oxalate, iron oxide, iron sulfate, iron hydroxide, iron nitrate, iron oxalate, copper oxide, copper sulfate, copper hydroxide, copper nitrate, copper oxalate, zinc oxide, zinc sulfate, zinc hydroxide, zinc nitrate, zinc oxalate, titanium oxide, titanium sulfate, titanium hydroxide, titanium nitrate, titanium oxalate, vanadium oxide, vanadium sulfate, vanadium hydroxide, vanadium nitrate, vanadium oxalate, chromium oxide, chromium sulfate, chromium hydroxide, chromium nitrate, chromium oxalate, or a combination thereof.

The M1 precursor and/or the M2 precursor can be a cobalt precursor including cobalt oxide, cobalt sulfate, cobalt hydroxide, cobalt nitrate, cobalt oxalate, or a combination thereof.

Examples of the phosphorus (P) precursor include $(NH_4)_2HPO_4$, $(NH_4)H_2PO_4$, $LiPO_3$, $LiH_2PO_4$, or a combination thereof.

After the mixing, the resultant obtained may be heat treated to obtain a composite represented by Formula 1. The heat treatment is performed, for example, at about 500° C. to about 1000° C., about 550° C. to about 900° C., or about 650° C. to about 750° C. The heat treatment is performed in an inert gas atmosphere or in an oxidizing gas atmosphere. For the inert gas atmosphere, an inert gas such as argon or nitrogen may be used. For the oxidizing gas atmosphere, an oxidizing gas such as air or an inert gas containing oxygen may be used. The heat treatment can be performed at a heating rate of about 1° C./min to about 10° C./min. The heat treatment can be performed for about 1 to about 48 hours, about 6 to about 24 hours, or about 6 to about 18 hours.

Drying may be optionally performed before the heat treatment. The drying can be performed at about 30° C. to about 150° C., about 50° C. to about 130° C., about 60° C. to about 120° C., or about 80° C. to about 100° C. When the drying is performed in this way, a positive electrode active material having more satisfactory energy density may be obtained.

Alternatively, the composite of Formula 1 may be prepared using a liquid phase method in addition to the solid phase method.

Hereinafter, descriptions will be detailed with reference to Examples and Comparative Examples, but the embodiment is not limited to the following examples.

EXAMPLES

Preparation of Positive Electrode Active Material

Preparation Example 1

$Li_2CO_3$, CoO, and $(NH_4)_2HPO_4$ were mixed to obtain a precursor mixture, and ethanol was added thereto. The resultant was milled in a ball mill for 10 hours. The amounts of $Li_2CO_3$, CoO, and $(NH_4)_2HPO_4$ were stoichiometrically controlled to obtain a positive electrode active material having a composition shown in Table 1, and ethanol was used in an amount of 100 parts by weight with respect to 100 parts by weight of a total amount of $Li_2CO_3$, CoO, and $(NH_4)_2HPO_4$. A molar ratio of $(NH_4)_2HPO_4$ to CoO was about 1:1.

The milled resultant was dried at 90° C. for 12 hours, and the dried product was heat treated at 750° C. in an air atmosphere for 12 hours to obtain a positive electrode active material.

The composition of the positive electrode active material was analyzed using ICP-AES (inductively induced plasma-atomic emission spectroscopy). The measured composition of the positive electrode active material was $Li_{0.98}Co_{0.89}PO_4$.

Preparation Example 2

Except that MnO was added in addition to CoO, the precursor mixture was prepared in the same manner as in Preparation Example 1 to obtain a positive electrode active material.

A molar ratio of $(NH_4)_2HPO_4$ to the mixture of CoO and MnO was about 1:1.

The composition of the positive electrode active material was analyzed using ICP-AES. The measured composition of the positive electrode active material was $Li_{1.02}Co_{0.91}Mn_{0.12}PO_4$.

Preparation Example 3

Except that $Fe_2O_3$ was added in addition to CoO, the precursor mixture was prepared in the same manner as in Preparation Example 1 to obtain a positive electrode active material.

A molar ratio of $(NH_4)_2HPO_4$ to the mixture of CoO and $Fe_2O_3$ was about 1:1.

The composition of the positive electrode active material was analyzed using ICP-AES. The measured composition of the positive electrode active material was $Li_{1.05}Co_{0.92}Fe_{0.11}PO_4$.

Preparation Example 4

Except that NiO was added in addition to CoO, the precursor mixture was prepared in the same manner as in Preparation Example 1 to obtain a positive electrode active material.

A molar ratio of $(NH_4)_2HPO_4$ to the mixture of CoO and NiO was about 1:1.

The composition of the positive electrode active material was analyzed using ICP-AES. The measured composition of the positive electrode active material was $Li_{1.05}Co_{0.92}Ni_{0.11}PO_4$.

Comparative Preparation Example 1

$LiCoPO_4$ (Toshima, Japan) was obtained and used as is.

The composition of the positive electrode active material was analyzed using ICP-AES. The measured composition of the positive electrode active material was $Li_{1.02}Co_{1.01}PO_4$.

Comparative Preparation Example 2

$Li_6Co_5(P_2O_7)_4$ was prepared using the following method.

$Li_2CO_3$, CoO, and $(NH_4)_2HPO_4$ were mixed to obtain a precursor mixture, and ethanol was added thereto and the resultant was milled in a ball mill for 10 hours. The amounts of $Li_2CO_3$, CoO, and $(NH_4)_2HPO_4$ were controlled such that a molar ratio of Li:Co:P was 6.0:5.0:8.4, and ethanol was used in an amount of 100 parts by weight with respect to 100 parts by weight of a total amount of $Li_2CO_3$, CoO, and $(NH_4)_2HPO_4$.

The milled resultant was dried at 90° C. for 12 hours, and the dried product was heat treated at 750° C. in an air atmosphere for 12 hours to obtain a positive electrode active material.

Comparative Preparation Example 3

$LiCoPO_4$ (Toshima, Japan) powder and $Li_6Co_5(P_2O_7)_4$ powder of Comparative Preparation Example 2 were simply mixed in a molar ratio of 7:3 and used.

Comparative Preparation Example 4

A positive electrode active material was obtained in the same manner as in Example 1, except that the molar ratio of $(NH_4)_2HPO_4$ to CoO was changed to 1.0:1.6.

Manufacture of Lithium Secondary Battery

Example 1

The positive electrode active material of Preparation Example 1, a conductive material, carbon black (Super-P; Timcal Ltd.), polyvinylidene fluoride (PVDF), and N-methylpyrrolidone were mixed to obtain a positive electrode slurry.

In the positive electrode slurry, a mixing weight ratio of the positive electrode active material, carbon black, and PVDF was 50:30:20, and the amount of N-methylpyrrolidone was about 20 g per 1 g of the positive electrode active material.

The positive electrode slurry was applied onto an aluminum foil having a thickness of about 15 μm, dried at 25° C., and then the dried resultant was vacuum-dried at about 120° C. and rolled to prepare a positive electrode having a thickness of about 55 μm.

A lithium metal counter electrode was used as a positive electrode and a counter electrode to prepare a 2032 type coin cell. A porous polyethylene (PE) film was disposed between the positive electrode and the lithium metal counter electrode, and a separator having a thickness of about 16 μm was interposed thereto, and electrolyte was injected thereto to prepare a lithium secondary battery in the form of a 2032 type coin cell. As the electrolyte, a solution containing 1.1 M $LiPF_6$ dissolved in a solvent in which ethylene carbonate (EC) and ethylmethyl carbonate (EMC) were mixed in a volume ratio of 3:5 was used.

Examples 2 to 4

A lithium secondary battery was manufactured in the same manner as in Example 1, except that the positive electrode active materials of Preparation Examples 2 to 4 were respectively used instead of the positive electrode active material of Preparation Example 1 upon the preparation of the positive electrode.

Comparative Examples 1 to 4

A lithium secondary battery was manufactured in the same manner as in Example 1, except that the positive electrode active materials of Comparative Preparation Examples 1 to 4 were respectively used instead of the positive electrode active material of Preparation Example 1 upon the preparation of the positive electrode.

Evaluation Example 1: X-Ray Diffraction Analysis
(I)

X-ray diffraction analysis was performed on the positive electrode active materials prepared in Preparation Examples 1 to 4 and Comparative Preparation Examples 1 to 4.

The X-ray diffraction analysis was performed with X'pert pro (PANalytical) using Cu Kα radiation (1.54056 Å).

Results of X-ray diffraction analysis for the positive electrode active materials prepared in Comparative Preparation Examples 1 to 2 and Preparation Examples 1 to 4 are shown in FIGS. 1A to 1F.

Based on the results of X-ray diffraction analysis on the positive electrode active materials prepared in Preparation Examples 1 to 4 and Comparative Preparation Examples 1 to 4, the types of crystalline phases included in the positive electrode active materials and amounts thereof were calculated and shown in Table 1.

As shown in FIG. 1A, the positive electrode active material having a composition of $LiCoPO_4$ prepared in Comparative Preparation Example 1 belongs to an orthorhombic crystal system, and only the first crystalline phase having a crystal structure that belongs to the Pnma space group was identified.

Figure 1B:
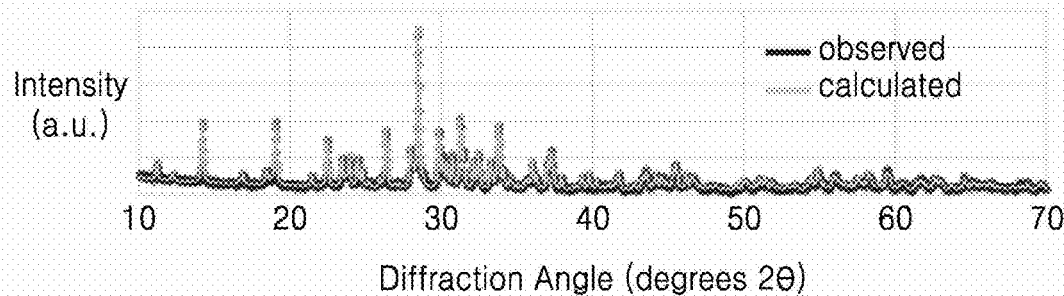
FIG. 1B is a graph of intensity (arbitrary units, a.u.) versus diffraction angle (degrees 2θ) showing X-ray diffraction analysis results of a positive electrode active material prepared in Comparative Preparation Example 2.
Figure 1C:
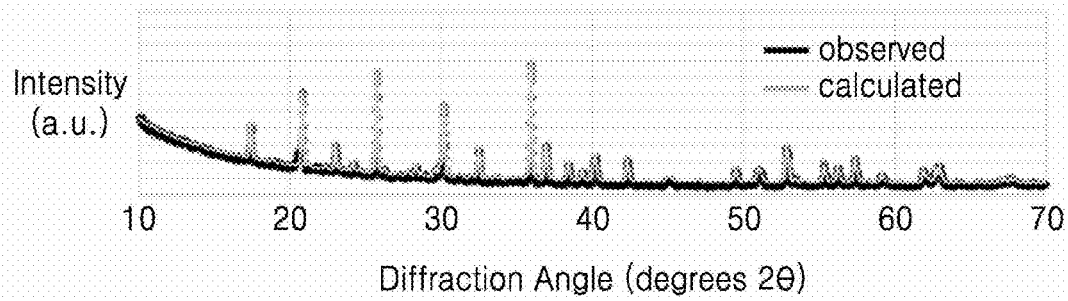
FIG. 1C is a graph of intensity (arbitrary units, a.u.) versus diffraction angle (degrees 2θ) showing X-ray diffraction analysis results of a positive electrode active material prepared in Preparation Example 1.
Figure 1D:
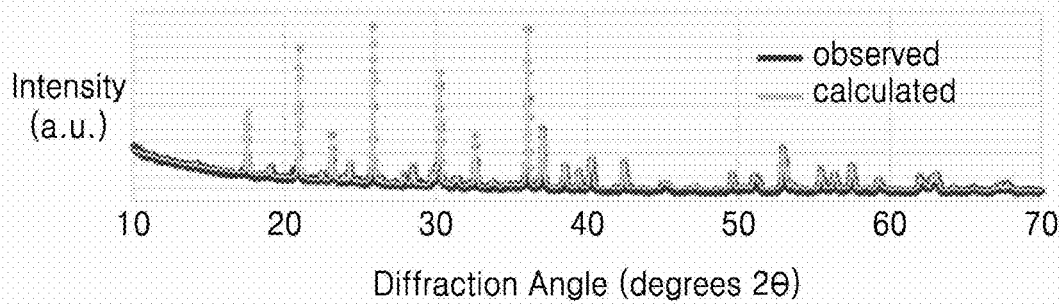
FIG. 1D is a graph of intensity (arbitrary units, a.u.) versus diffraction angle (degrees 2θ) showing X-ray diffraction analysis results of a positive electrode active material prepared in Preparation Example 2.
Figure 1E:
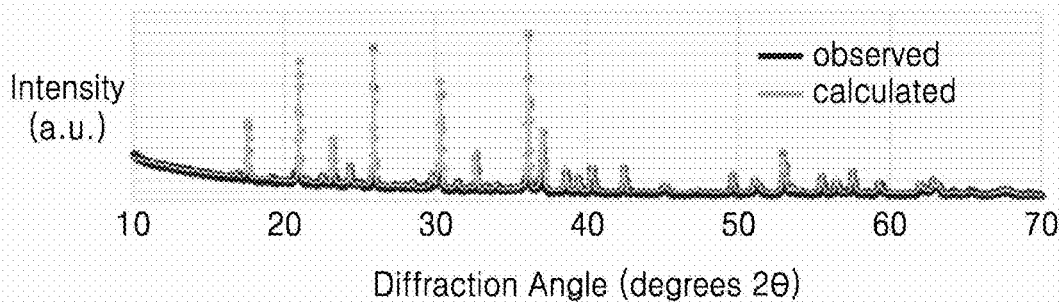
FIG. 1E is a graph of intensity (arbitrary units, a.u.) versus diffraction angle (degrees 2θ) showing X-ray diffraction analysis results of a positive electrode active material prepared in Preparation Example 3.
Figure 1F:
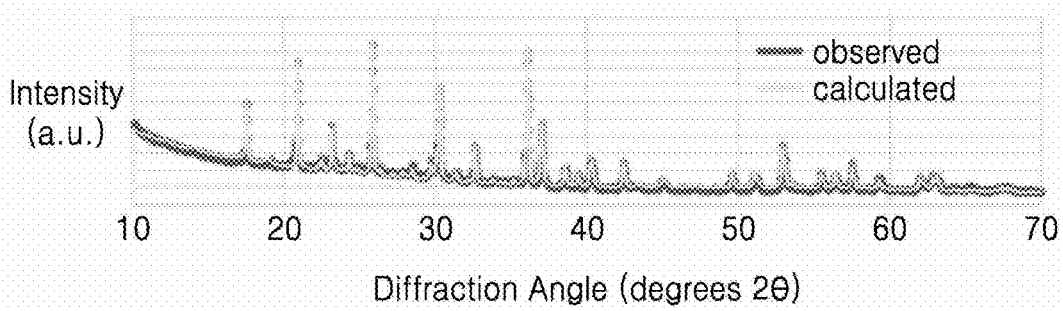
FIG. 1F is a graph of intensity (arbitrary units, a.u.) versus diffraction angle (degrees 2θ) showing X-ray diffraction analysis results of a positive electrode active material prepared in Preparation Example 4.

As shown in FIG. 1B, the positive electrode active material having a composition of $Li_6Co_5(P_2O_7)_4$ prepared in Comparative Preparation Example 2 belongs to a triclinic crystal system, and only the second crystalline phase having a crystal structure that belongs to the P-1 space group was identified.

As shown in FIGS. 1C to 1F, the lithium-transition metal composite phosphates prepared in Preparation Examples 1 to 4 was confirmed to include: both a first crystalline phase belonging to an orthorhombic crystal system and having a crystal structure belonging to the Pnma space group; and a second crystalline phase belonging to a triclinic crystal system and having a pyrophosphate-containing crystal structure belonging to the P-1 space group, and include a composite phase in which the first crystalline phase and the second crystalline phase form a composite.

Figure 10:
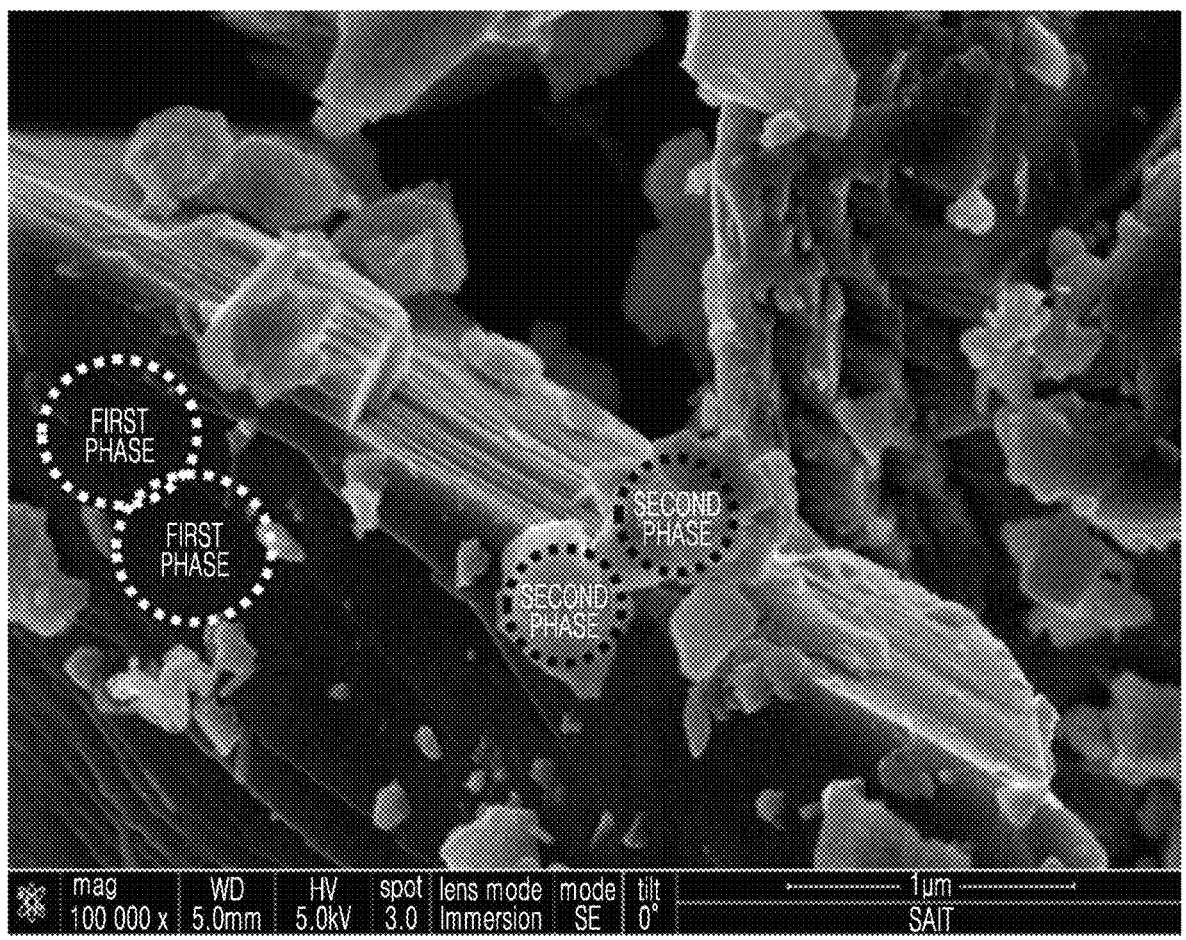
FIG. 10 is a scanning electron microscope (SEM) image of a lithium-transition metal composite phosphate prepared in Preparation Example 1.

As shown in FIG. 10, it was confirmed that the first crystalline phase and the second crystalline phase formed a composite phase in the scanning electron microscope image of the lithium-transition metal composite phosphate prepared in Preparation Example 1.

TABLE 1

|  | Composition | First crystalline phase [mol %] | Second crystalline phase [mol %] |
|---|---|---|---|
| Comparative Preparation Example 1 | $Li_{1.02}Co_{1.01}PO_4$ | 100 | 0 |
| Comparative Preparation Example 2 | $Li_6Co_5(P_2O_7)_4$ | 0 | 100 |

TABLE 1-continued

|  | Composition | First crystalline phase [mol %] | Second crystalline phase [mol %] |
|---|---|---|---|
| Comparative Preparation Example 3 | Simple mixture of $LiCoPO_4$ and $Li_6CO_5(P_2O_7)_4$ | 70 | 30 |
| Comparative Preparation Example 4 | — | 11 | 89 |
| Preparation Example 1 | $Li_{0.98}Co_{0.89}PO_4$ | 83 | 17 |
| Preparation Example 2 | $Li_{1.02}Co_{0.91}Mn_{0.12}PO_4$ | 76 | 24 |
| Preparation Example 3 | $Li_{1.05}Co_{0.92}Fe_{0.11}PO_4$ | 74 | 26 |
| Preparation Example 4 | $Li_{1.05}Co_{0.92}Ni_{0.11}PO_4$ | 70 | 30 |

As shown in Table 1, the positive electrode active material of Comparative Preparation Example 1 included only the first crystalline phase, but the lithium-transition metal composite phosphates of Preparation Examples 1 to 4 included the first crystalline phase and the second crystalline phase, and the two formed a composite phase.

Evaluation Example 1: X-Ray Diffraction Analysis (II)

X-ray diffraction analysis was performed on the positive electrode active materials prepared in Preparation Examples 1 to 4 and Comparative Preparation Examples 1 to 2. The X-ray diffraction analysis was performed with X'pert pro (PANalytical) using Cu Kα radiation (1.54056 Å).

Results of X-ray diffraction analysis for the positive electrode active materials prepared in Preparation Examples 1 to 4 and Comparative Preparation Examples 1 to 2 are shown in FIGS. 1A to 1F.

The intensity ratio of a primary peak and a secondary peak obtained through the X-ray diffraction analysis for the positive active materials prepared in Preparation Examples 1 to 4 and Comparative Preparation Examples 1 to 2 was measured according to Equation 1 and the results are shown in Table 2.

The primary peak (P1) was observed at a diffraction angle of 25.8°2θ±0.5°2θ and the secondary peak which is a peak having a less absorption intensity than the primary peak was observed at a diffraction angle of 28.3°2θ±0.5°2θ.

Peak Intensity Ratio(P2/P1)=Secondary Peak Intensity(P2)/Primary Peak Intensity(P1)   Equation 1

TABLE 2

|  | Intensity ratio (P2/P1) |
|---|---|
| Comparative Preparation Example 1 | 0 |
| Comparative Preparation Example 2 | Greater than 1 |
| Preparation Example 1 | 0.11 |
| Preparation Example 2 | 0.12 |
| Preparation Example 3 | 0.04 |
| Preparation Example 4 | 0.12 |

In Table 2, the positive electrode active materials of Preparation Examples 1 to 4 had an intensity ratio of 0.01 to 1.

On the other hand, in Comparative Preparation Example 1, the secondary peak was not observed, indicating that the intensity ratio was 0, and in Comparative Preparation Example 2, the secondary peak intensity was greater than the primary peak intensity, indicating that the intensity ratio was greater than 1.

Evaluation Example 3: Evaluation of Charging/Discharging Characteristics at Room Temperature (I)

Constant current charging was performed on the lithium batteries manufactured in Examples 1, and Comparative Examples 1, 3, and 4 at a current of 0.1 C rate at 25° C. up to 5.2 V (vs. Li), and constant current charging was performed on the lithium battery manufactured in Comparative Example 2 up to 5.5 V (vs. Li).

Then, discharging was performed for each battery at a constant current of 1.0 C rate up to 4 V (vs. Li) at the time of discharging. A C rate means a current which will discharge a battery in one hour, e.g., a C rate for a battery having a discharge capacity of 1.6 ampere-hours would be 1.6 amperes.

Figure 2:
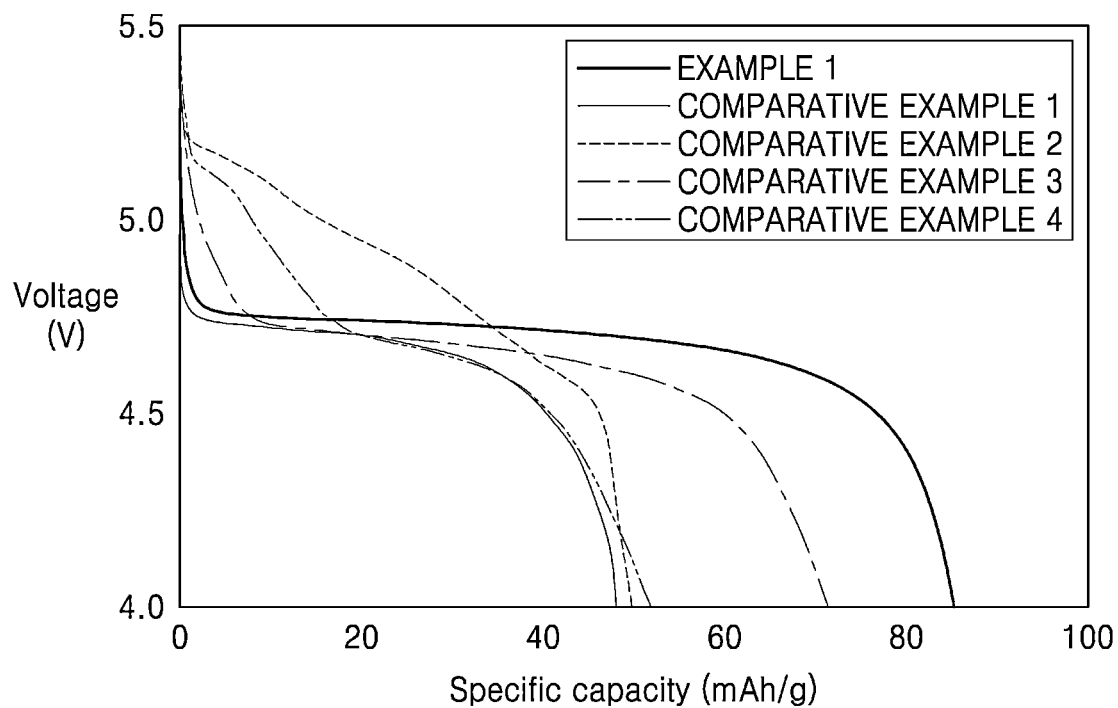
FIG. 2 is a graph of voltage (volts, v) versus specific capacity (milliampere hours per gram, mAh/g) showing discharge profiles of lithium batteries of Example 1 and Comparative Examples 1 to 4.

Results of the charging/discharging experiments are shown in FIG. 2 and Table 3. The discharge capacity is a discharge capacity in the cycle, and the discharge voltage is an average discharge voltage.

As shown in FIG. 2 and Table 3, the lithium battery of Example 1 had significantly improved discharge capacity compared to the lithium batteries of Comparative Examples 1 to 4, and showed a discharge capacity of 80 mAh/g or more, and a discharge voltage of 4.5 V or more.

Evaluation Example 4: Evaluation of Charging/Discharging Characteristics at Room Temperature (II)

Constant current charging was performed on the lithium batteries manufactured in Examples 1 to 4, and Comparative Examples 1, 3, and 4 at a current of 0.1 C rate at 25° C. up to 5.2 V (vs. Li), and then, discharging was performed at a constant current of 1.0 C rate up to 4 V (vs. Li) at the time of discharging ($1^{st}$ cycle).

The charging/discharging of the lithium battery subjected to the 1st cycle was repeated up to the $5^{th}$ cycle under the same conditions.

Results of the charging/discharging experiments are shown in Table 3. Lifespan characteristics were represented by Equation 2.

Capacity retention=(discharge capacity at $5^{th}$ cycle/discharge capacity at $1^{st}$ cycle)×100%   Equation 2

TABLE 3

|  | Discharge capacity [mAh/g] | Discharge voltage [V vs. Li] | Capacity retention [%] |
|---|---|---|---|
| Comparative Example 1 | 48 | 4.68 | 66 |
| Comparative Example 3 | 72 | 4.63 | 79 |
| Comparative Example 4 | 52 | 4.67 | 75 |
| Example 1 | 90 | 4.71 | 88 |
| Example 2 | 92 | 4.76 | 82 |
| Example 3 | 90 | 4.75 | 96 |
| Example 4 | 86 | 4.73 | 89 |

As shown in Table 3, the lithium batteries of Examples 1 to 4 had improvements in all of the discharge capacity, discharge voltage, and lifespan characteristics compared to the lithium batteries of Comparative Examples 1, 3 and 4.

According to an aspect, provided is a positive electrode active material having high voltage and improved discharge capacity.

When a positive electrode including such a positive electrode active material is used, a secondary battery having improved lifespan characteristics and energy density may be manufactured.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A composite positive electrode active material comprising:
    a lithium-transition metal composite phosphate comprising
    a first crystalline phase having a composition represented by Formula 1 and having an olivine structure; and
    a second crystalline phase having a composition represented by Formula 2 and having a pyrophosphate-containing structure,
    wherein the second crystalline phase is contained in an amount of about 5 mole percent to about 45 mole percent, with respect to a total number of moles of the first crystalline phase and the second crystalline phase, $$Li_xM1_yPO_4 \quad \text{Formula 1}$$

$$Li_aM2_b(P_2O_7)_4 \quad \text{Formula 2}$$

wherein in Formulas 1 and 2, $0.9 \leq x \leq 1.1$, $0.9 \leq y \leq 1.1$, $5.5 \leq a \leq 6.5$, and $4.8 \leq b \leq 5.2$, and
    M1 and M2 are each independently an element from Groups 3 to 11 in the 4th period of the Periodic Table of the Elements, or a combination thereof.

2. The composite positive electrode active material of claim 1,
    wherein M1 and M2 are each independently Co, Ni, Mn, Fe, Cu, Zn, Ti, V, Cr, or a combination thereof.

3. The composite positive electrode active material of claim 1,
    wherein the first crystalline phase has a composition represented by Formula 3:

$$Li_x(Co_{1-w}M3_w)_yPO_4 \quad \text{Formula 3}$$

wherein in Formula 3, $0.9 \leq x \leq 1.1$, $0.9 \leq y \leq 1.1$, and $0 \leq w \leq 1$, and
    M3 is an element from Groups 3 to 8, 10, and 11 in the 4th period of the Periodic Table of the Elements, or a combination thereof.

4. The composite positive electrode active material of claim 3,
    wherein M3 is Ni, Mn, Fe, Cu, Zn, Ti, V, Cr, or a combination thereof.

5. The composite positive electrode active material of claim 1,
    wherein the first crystalline phase has a composition selected from compositions represented by Formulas 4a to 4i:

$$Li_xCo_yPO_4 \quad \text{Formula 4a}$$

wherein in Formula 4a, $0.9 < x < 1.1$, and $0.9 < y < 1.1$, $$Li_x(Co_{1-w}Ni_w)_yPO_4 \quad \text{Formula 4b}$$

wherein in Formula 4b, $0.9 < x < 1.1$, $0.9 < y < 1.1$, and $0 < w < 1$, $$Li_x(Co_{1-w}Mn_w)_yPO_4 \quad \text{Formula 4c}$$

wherein in Formula 4c, $0.9 < x < 1.1$, $0.9 < y < 1.1$, and $0 < w < 1$, $$Li_x(Co_{1-w}Fe_w)_yPO_4 \quad \text{Formula 4d}$$

wherein in Formula 4d, $0.9 < x < 1.1$, $0.9 < y < 1.1$, and $0 < w < 1$, $$Li_x(Co_{1-w}Cu_w)_yPO_4 \quad \text{Formula 4e}$$

wherein in Formula 4e, $0.9 < x < 1.1$, $0.9 < y < 1.1$, and $0 < w < 1$, $$Li_x(Co_{1-w}Zn_w)_yPO_4 \quad \text{Formula 4f}$$

wherein in Formula 4f, $0.9 < x < 1.1$, $0.9 < y < 1.1$, and $0 < w < 1$, $$Li_x(Co_{1-w}Ti_w)_yPO_4 \quad \text{Formula 4g}$$

wherein in Formula 4g, $0.9 < x < 1.1$, $0.9 < y < 1.1$, and $0 < w < 1$, $$Li_x(Co_{1-w}V_w)_yPO_4 \quad \text{Formula 4h}$$

wherein in Formula 4h, $0.9 < x < 1.1$, $0.9 < y < 1.1$, and $0 < w < 1$, or $$Li_x(Co_{1-w}Cr_w)_yPO_4 \quad \text{Formula 4i}$$

wherein in Formula 4i, $0.9 < x < 1.1$, $0.9 < y < 1.1$, and $0 < w < 1$.

6. The composite positive electrode active material of claim 1,
    wherein the second crystalline phase has a composition represented by Formula 5:

$$Li_cM4_d(P_2O_7)_4 \quad \text{Formula 5}$$

wherein in Formula 5, $5.6 \leq c \leq 6.4$ and $4.8 \leq d \leq 5.2$, and M4 is Co, Ni, Mn, Fe, or a combination thereof.

7. The composite positive electrode active material of claim 1,
    wherein the second crystalline phase has a composition represented by Formula 6:

$$Li_eCo_f(P_2O_7)_4 \quad \text{Formula 6}$$

wherein in Formula 6, $5.7 \leq e \leq 6.3$ and $4.9 \leq f \leq 5.1$.

8. The composite positive electrode active material of claim 1,
    wherein the composite positive electrode active material comprises a composite phase comprising the first crystalline phase and the second crystalline phase.

9. The composite positive electrode active material of claim 1,
    wherein the lithium-transition metal composite phosphate has a composition represented by Formula 7:

$$pLi_aM2_b(P_2O_7)_4 \cdot (1-p)Li_xM1_yPO_4 \quad \text{Formula 7}$$

wherein in Formula 7, $0 \leq p \leq 0.5$, $0.9 \leq x \leq 1.1$, $0.9 \leq y \leq 1.1$, $5.5 \leq a \leq 6.5$, and $4.8 \leq b \leq 5.2$, and
    M1 and M2 are each independently an element from Groups 3 to 11 in the 4th period of the Periodic Table of the Elements, or a combination thereof.

10. The composite positive electrode active material of claim 1,
    wherein the lithium-transition metal composite phosphate has a composition represented by Formula 8:

$$Li_gM5_qPO_4 \quad \text{Formula 8}$$

wherein in Formula 8, 0.8≤c≤1.2 and 0.8≤d≤1.22, and

M5 is an element from Groups 3 to 11 in the 4th period of the Periodic Table of the Elements, or a combination thereof.

11. The composite positive electrode active material of claim 10, wherein the lithium-transition metal composite phosphate has a composition represented by Formula 9:

$$Li_cCo_eM6_fPO_4 \quad \text{Formula 9}$$

wherein in Formula 9, 0.8≤c≤1.2, 0.8≤e≤1.2, and 0≤f≤0.2, and

M6 is Ni, Mn, Fe, Cu, Zn, Ti, V, Cr, or a combination thereof.

12. The composite positive electrode active material of claim 1, wherein the first crystalline phase has a crystal structure that belongs to an orthorhombic crystal system, and the second crystalline phase has a crystal structure that belongs to a triclinic crystal system.

13. The composite positive electrode active material of claim 1, wherein the first crystalline phase has a crystal structure that belongs to a Pnma space group, and the second crystalline phase has a crystal structure that belongs to a P-1 space group.

14. The composite positive electrode active material of claim 1, wherein the lithium-transition metal composite phosphate has a primary peak at a diffraction angle of 25.8°2θ±0.5°2θ and a secondary peak at a diffraction angle of 28.3°2θ±0.5°2θ, when analyzed by an X-ray diffraction using CuKα radiation.

15. The composite positive electrode active material of claim 14, wherein a ratio of an intensity of the primary peak to an intensity of the secondary peak of the lithium-transition metal composite phosphate is about 0.01 to less than about 1, when analyzed by an X-ray diffraction using CuKα radiation.

16. The composite positive electrode active material of claim 1, wherein the lithium-transition metal composite phosphate has an average discharge voltage of about 4.5 volts to about 5 volts.

17. The composite positive electrode active material of claim 1, wherein the lithium-transition metal composite phosphate has a specific capacity of about 50 milliampere-hours per gram to 160 milliampere-hours per gram.

18. A positive electrode comprising a cathode current collector and a cathode active material layer on a surface of the cathode current collector, the cathode active material layer comprising the composite positive electrode active material of claim 1.

19. A secondary battery comprising:
a positive electrode;
a negative electrode; and
an electrolyte positioned between the positive electrode and the negative electrode,
wherein the positive electrode comprises the composite positive electrode active material of claim 1.

20. The secondary battery of claim 19, wherein the secondary battery is a multi-layer-ceramic battery comprising a plurality of positive electrode layers, at least one of the plurality of the positive electrode layers comprising the composite positive electrode active material;

a plurality of negative electrode layers alternately positioned between the plurality of positive electrode layers; and a plurality of solid electrolyte layers alternately positioned between and separating positive electrode layers and negative electrode layers of the plurality of positive electrode layers and the plurality of negative electrode layers.

21. The secondary battery of claim 20, wherein a solid electrolyte included in the solid electrolyte layers is an oxide solid electrolyte.

22. The secondary battery of claim 20, wherein the negative electrode layers comprise a negative electrode active material comprising a lithium metal phosphate, a lithium metal oxide, a metal oxide, or a combination thereof.

23. The secondary battery of claim 20, wherein the multi-layer-ceramic battery is a sintered product.

24. A method of preparing a composite positive electrode active material, the method comprising:

mixing an M1 precursor, an M2 precursor, a lithium precursor, and a phosphorus precursor to prepare a precursor mixture; and heat-treating the precursor mixture to form the composite positive electrode active material comprising a lithium-transition metal composite phosphate, wherein, in the precursor mixture, a molar ratio of the sum of M1 and M2 to phosphorus is about 1:0.8 to about 1:1.3, the lithium-transition metal composite phosphate comprises a first crystalline phase having a composition represented by Formula 1 and having an olivine structure, and a second crystalline phase having a composition represented by Formula 2 and having a pyrophosphate-containing structure, and the second crystalline phase is in an amount of about 5 mole percent to about 45 mole percent, with respect to a total number of moles of the first crystalline phase and the second crystalline phase:

$$Li_xM1_yPO_4 \quad \text{Formula 1}$$

$$Li_aM2_b(P_2O_7)_4 \quad \text{Formula 2}$$

wherein in Formulas 1 and 2, 0.9≤x≤1.1, 0.9≤y≤1.1, 5.5≤a≤6.5, and 4.8≤b≤5.2, and M1 and M2 are each independently an element from Groups 3 to 11 in the 4th period of the Periodic Table of the Elements, or a combination thereof.

25. The method of claim 24, wherein the heat-treating the precursor mixture comprises heat-treating at about 600° C. to about 900° C. for about 1 to about 48 hours.

26. The method of claim 24, wherein the heat-treating the precursor mixture comprises heat-treating in an oxidizing atmosphere.

27. The composite positive electrode active material of claim 3, wherein 0<w<1.

* * * * *